United States Patent
Aoi et al.

(10) Patent No.: US 9,417,439 B2
(45) Date of Patent: Aug. 16, 2016

(54) ZOOM LENS AND IMAGING APPARATUS

(71) Applicant: FUJIFILM Corporation, Tokyo (JP)

(72) Inventors: Toshihiro Aoi, Saitama-ken (JP); Shinkichi Ikeda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/698,051

(22) Filed: Apr. 28, 2015

(65) Prior Publication Data
US 2015/0309292 A1 Oct. 29, 2015

Related U.S. Application Data

(63) Continuation of application No. PCT/JP2013/006454, filed on Oct. 31, 2013.

(30) Foreign Application Priority Data

Nov. 8, 2012 (JP) .................. 2012-246210

(51) Int. Cl.
*G02B 15/14* (2006.01)
*G02B 15/173* (2006.01)

(52) U.S. Cl.
CPC .............. *G02B 15/14* (2013.01); *G02B 15/173* (2013.01)

(58) Field of Classification Search
CPC ...... G02B 15/14; G02B 15/173; G02B 15/24; G02B 15/28; G02B 9/34; G02B 13/004
See application file for complete search history.

(56) References Cited

U.S. PATENT DOCUMENTS

| 8,254,036 B2 * | 8/2012 | Aoi ................ G02B 27/646 |
| | | 359/687 |
| 2007/0273979 A1 | 11/2007 | Kawakami et al. |
| 2010/0085647 A1 | 4/2010 | Nurishi |

FOREIGN PATENT DOCUMENTS

| JP | 06-186477 | 7/1994 |
| JP | 2007-310179 | 11/2007 |
| JP | 2008-003535 | 1/2008 |
| JP | 2009-128491 | 6/2009 |
| JP | 2009-217121 | 9/2009 |
| JP | 2010-091788 | 4/2010 |

OTHER PUBLICATIONS

International Search Report, PCT/JP2013/006454, Mar. 18, 2014.

* cited by examiner

*Primary Examiner* — Joseph P Martinez
(74) *Attorney, Agent, or Firm* — Young & Thompson

(57) ABSTRACT

A zoom lens consists of a positive first lens group fixed during zooming, a negative second lens group moved during zooming, a positive third lens group moved during zooming to correct an image plane variation due to the zooming, and a positive fourth lens group fixed during zooming and includes a stop on the most object side. The second lens group includes two or more positive lenses and one or more negative lenses. The zoom lens satisfies predetermined conditional expressions with respect to the second lens group.

10 Claims, 15 Drawing Sheets

EXAMPLE 4

EXAMPLE 5

EXAMPLE 6

ZOOM LENS AND IMAGING APPARATUS

CROSS-REFERENCE TO RELATED APPLICATIONS

This application is a Continuation of PCT International Application No. PCT/JP2013/006454 filed on Oct. 31, 2013, which claims priority under 35 U.S.C. §119 (a) to Japanese Patent Application No. 2012-246210 filed on Nov. 8, 2012. Each of the above applications is hereby expressly incorporated by reference, in its entirety, into the present application.

TECHNICAL FIELD

The present invention relates to a zoom lens and an imaging apparatus, and more specifically to a zoom lens suitable for use with a television camera, a video camera, and the like, and an imaging apparatus equipped with the zoom lens.

BACKGROUND ART

As a zoom lens mounted on television cameras, video cameras, and the like, a four-group type as described, for example, in Japanese Unexamined Patent Publication No. 2010-091788 is known. The zoom lens has a configuration in which a first lens group fixed during zooming, a second lens group having a zoom function, a third lens group having a function to correct an image plane variation due to the zooming, and a fourth lens group fixed during zooming are disposed in order from the object side.

Further, a four-group type in which the second lens group or the third lens group is divided is also proposed in order to realize a higher performance. For example, Japanese Unexamined Patent Publication No. 2009-128491 describes a five-group zoom lens, but it can be regarded as a four-group type in which the third lens group is divided into two lens groups, and these are moved relatively.

SUMMARY OF INVENTION

Technical Problem

Recently, in the field zoom lenses mounted on television cameras and the like, there have been growing needs for a higher magnification, a wider angle of view, and a higher performance over the entire zoom range, and a zoom lens that simultaneously satisfies these requirements has been demanded. In order to simultaneously realize a higher magnification, a wider angle of view, and a higher performance, it is necessary to satisfactorily correct chromatic aberration. An attempt to realize a wider angle of view with the foregoing four-group type will result in that the angle of a ray incident on the second lens group is increased on the wide angle side and lateral chromatic aberration is increased. An attempt to realize a higher magnification will lead to a longer focal length, and an attempt to realize a longer focal length will result in that longitudinal chromatic aberration is increased on the telephoto side and the variation in chromatic aberration is increased when zooming is performed from the wide angle end to the telephoto end. The longitudinal chromatic aberration on the telephoto side is predominantly influenced by the configuration of the first lens group and the material used. An attempt to realize a longer focal length will result in that uncorrectable longitudinal chromatic aberration remains as a residual secondary spectrum which is magnified at the telephoto end and performance is degraded.

The zoom lens described in Japanese Unexamined Patent Publication No. 2010-091788 has achieved a high magnification but the chromatic aberration correction effect of the second lens group is small. Further, the angle of view on the wide angle side is 65° or less, which is insufficient to respond to the needs for wider angles of view. The zoom lens described in Japanese Unexamined Patent Publication No. 2009-128491 employs a floating system and has realized a high performance over the entire zoom range, but the zoom ratio is about 54× and a higher magnification may sometimes be required in recent years.

The present invention has been developed in view of the circumstances described above, and it is an object of the present invention to provide a zoom lens that simultaneously realizes a higher magnification, a wider angle of view, and a higher performance over the entire zoom range, and an imaging apparatus equipped with such a zoom lens.

Solution to Problem

A zoom lens of the present invention consists essentially of four lens groups, composed of a first lens group having a positive refractive power and being fixed during zooming, a second lens group having a negative refractive power and being moved during zooming, a third lens group having a positive refractive power and being moved during zooming to correct an image plane variation due to the zooming, and a fourth lens group having a positive refractive power and being fixed during zooming, in order from the object side, wherein a stop is disposed on the most object side in the fourth lens group, the second lens group and the third lens group each pass through a point where the imaging magnification of each corresponding lens group is −1× at the same time during zooming from the wide angle end to the telephoto end, the second lens group includes at least two positive lenses and at least one negative lens and, when the d-line Abbe number and the partial dispersion ratio between the g-line and the F-line of one positive lens included in the second lens group are taken as νp and Pp respectively, the zoom lens satisfies conditional expressions (1) and (2) given below:

$$75.00 < \nu p \quad (1)$$

$$0.520 < Pp < 0.550 \quad (2)$$

where, νp and Pp are defined, when the refractive indices of the positive lens related to the conditional expressions (1) and (2) with respect to the g-line (wavelength 435.84 nm), F-line (wavelength 486.13 nm), d-line (wavelength 587.56 nm), and C-line (wavelength 656.27 nm) of the Fraunhofer lines are taken as Ng, NF, Nd, and NC respectively, as νp=(Nd−1)/(NF−NC) and Pp=(Ng−NF)/(NF−NC).

Preferably, the zoom lens satisfies a conditional expression (1') given below, instead of the conditional expression (1) described above:

$$80.00 < \nu p \quad (1').$$

Preferably, the zoom lens satisfies a conditional expression (2') given below, instead of the conditional expression (2) described above:

$$0.530 < Pp < 0.540 \quad (2').$$

In the zoom lens of the present invention, the second lens group preferably includes, on the most image side, a cemented lens in which three lenses of a positive lens, a negative lens, and a positive lens are cemented in order from the object side. In a case where the second lens group includes such a cemented lens, the one positive lens of the second lens group that satisfies the conditional expressions (1) and (2) preferably constitutes the cemented lens.

Preferably, in the zoom lens of the present invention, the second lens group includes a cemented lens on the most image side and satisfies a conditional expression (3) given below, and more preferably satisfies a conditional expression (3') given below when the focal length of the cemented lens and the focal length of the second lens group are taken as f2cem and f2 respectively:

$$1.00<|f2cem/f2|<44.00 \qquad (3)$$

$$3.00|f2cem/f2|<42.00 \qquad (3').$$

Preferably, in the zoom lens of the present invention, both the first and second lenses from the object side in the second lens group are single lenses having a negative refractive power and the object side surface of the most object side negative lens in the second lens group is aspherical.

Preferably, in the zoom lens of the present invention, the third lens group is composed of a third-a lens group having a positive refractive power and a third-b lens group having a positive refractive power, in order from the object side, and the third-a lens group and the third-b lens group are moved independently during zooming from the wide angle end to the telephoto end.

The foregoing each "lens group" is not necessarily composed of a plurality of lenses and includes a lens group composed of only one lens.

The foregoing "essentially" in the context of "consists essentially of" intends that the zoom lens may include a lens having substantially no refractive power, an optical element other than a lens, such as a stop, a cover glass, a filter, and the like, a lens flange, a lens barrel, an image sensor, and a mechanical component, such as a camera shake correction mechanism, in addition to the constituent elements described above.

The signs of the foregoing refractive powers are considered in the paraxial region for those having an aspherical surface.

The "single lens" refers to a lens formed of one uncemented lens.

An imaging apparatus of the present invention is equipped with the zoom lens of the present invention described above.

Advantageous Effects of Invention

According to the zoom lens of the present invention, in a four-group zoom lens in which positive, negative, positive, and positive lens groups are disposed in order from the object side, each configuration is set suitably, in particular, the second lens group and the third lens group are each configured to pass through a point where the imaging magnification of each corresponding lens group is −1× at the same time during zooming from the wide angle end to the telephoto end, and the material of a positive lens included in the second lens group is defined appropriately. This allows a higher magnification, a wider angle of view, and a higher performance over the entire zoom range may be achieved simultaneously.

According to the imaging apparatus of the present invention, it is possible to perform wide angle and high magnification imaging, and favorable images may be obtained over the entire zoom range, since the apparatus is equipped with the zoom lens of the present invention.

Figure 9:
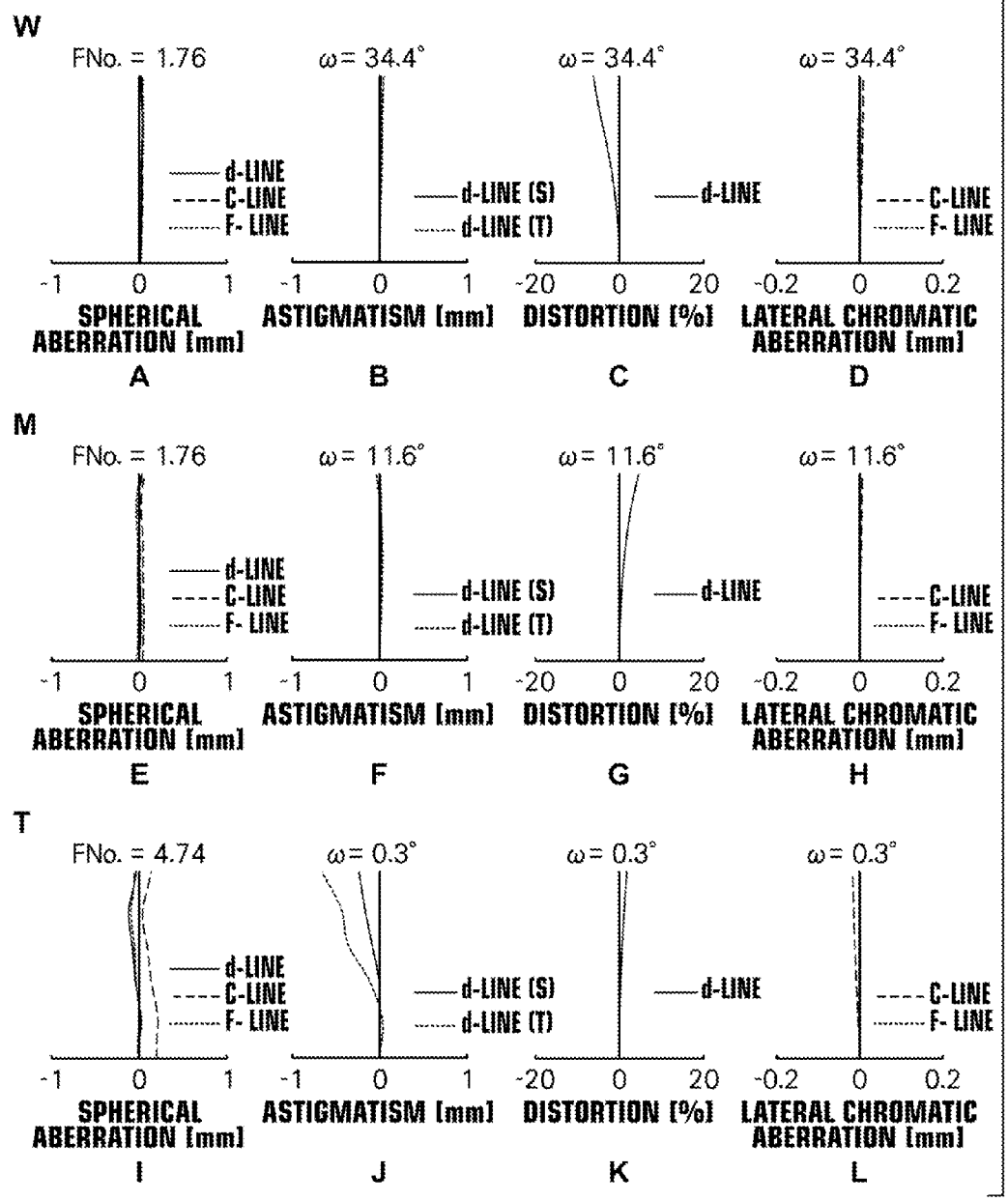

A to L of FIG. 9 show each aberration diagram of the zoom lens of Example 1.

Figure 10:
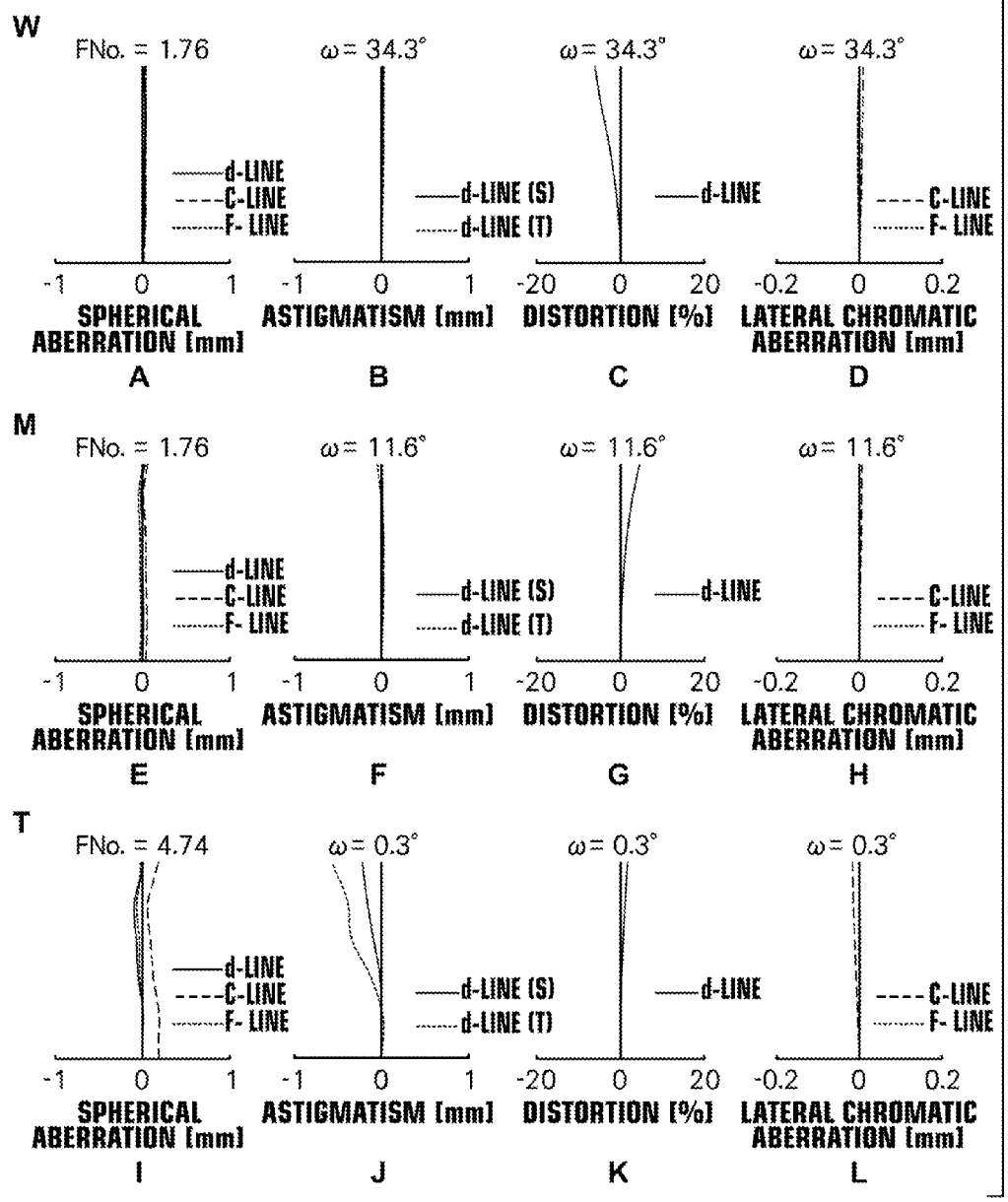

A to L of FIG. 10 show each aberration diagram of the zoom lens of Example 2.

Figure 11:
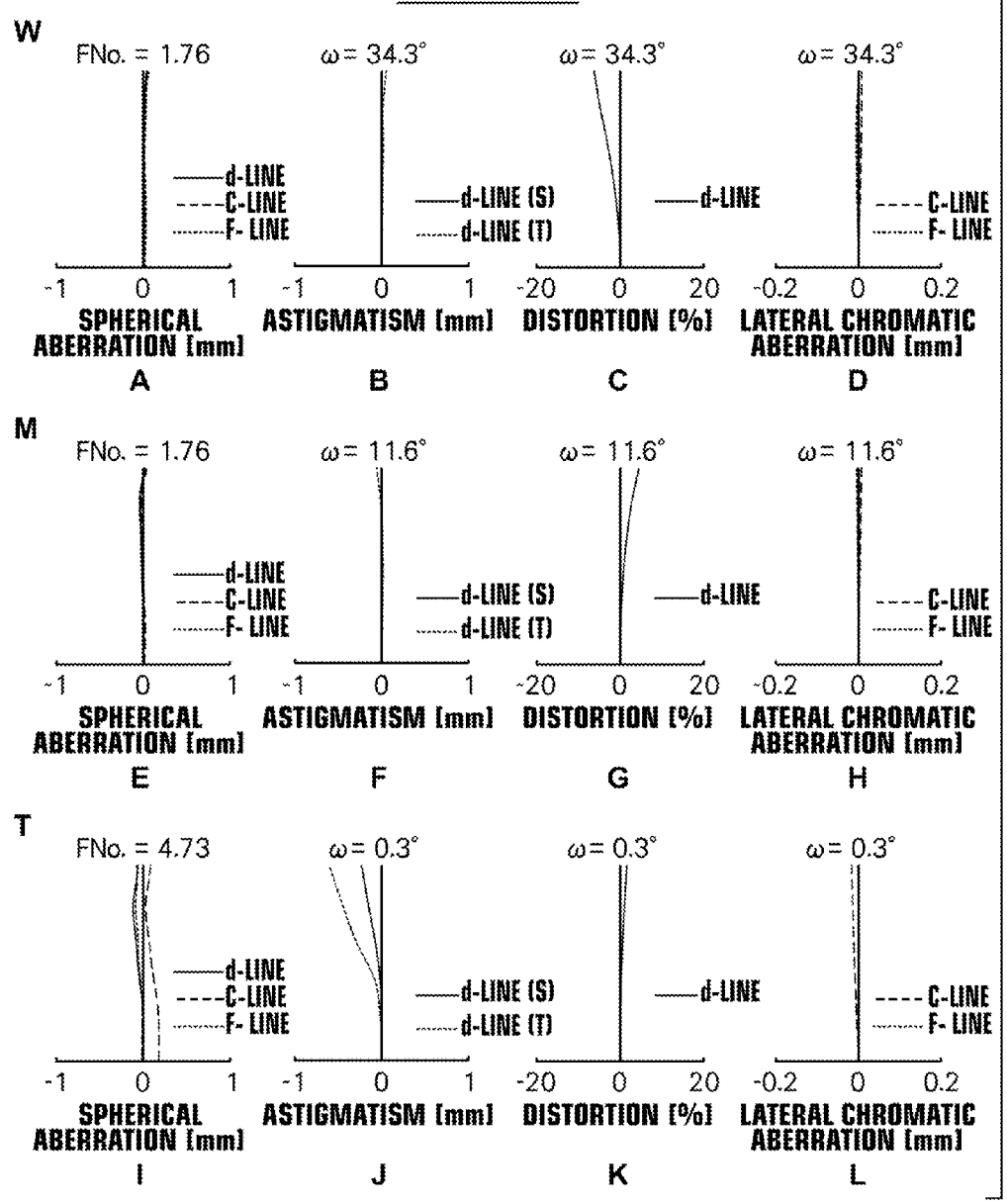

A to L of FIG. 11 show each aberration diagram of the zoom lens of Example 3.

Figure 12:
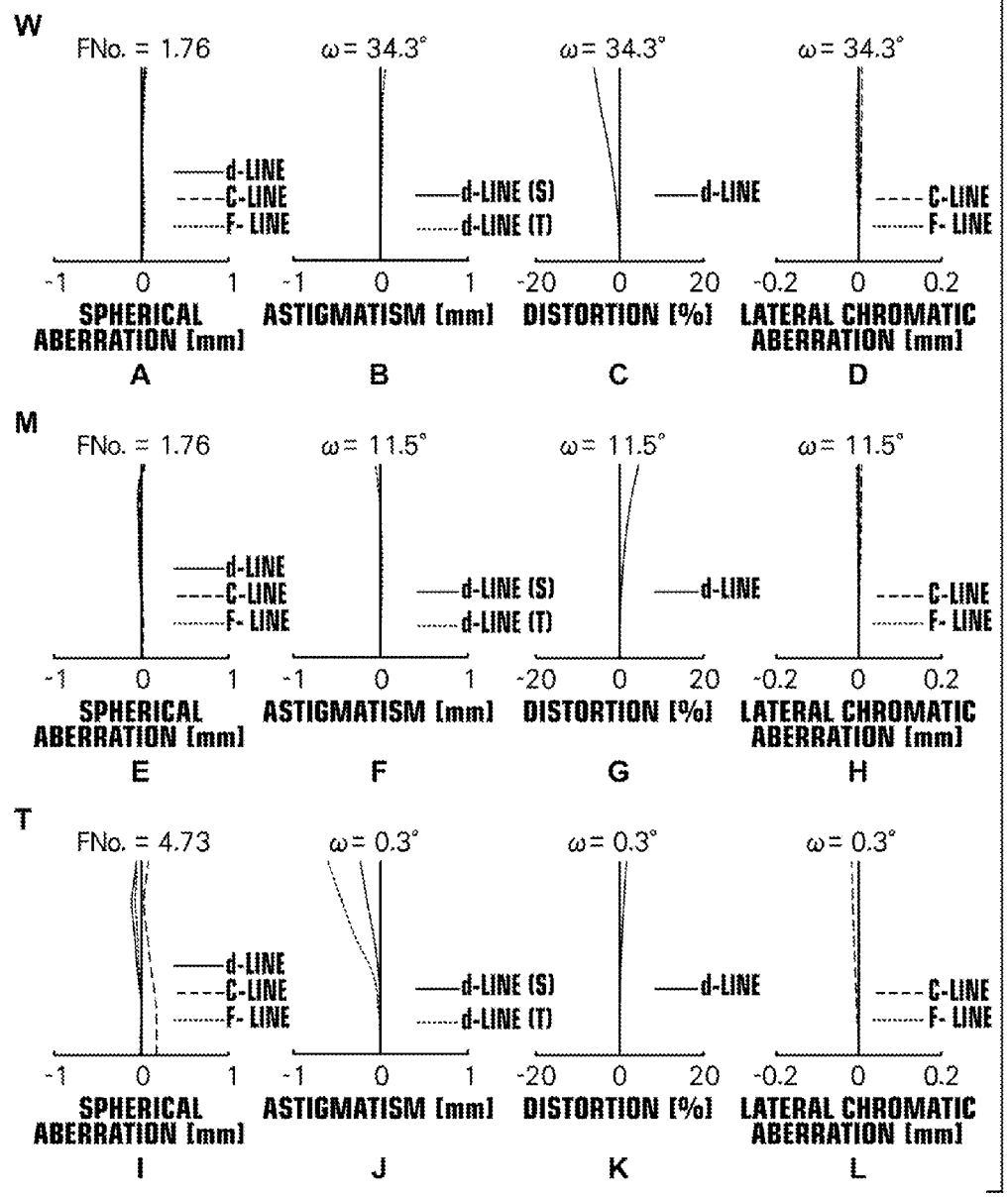

A to L of FIG. 12 show each aberration diagram of the zoom lens of Example 4.

Figure 13:
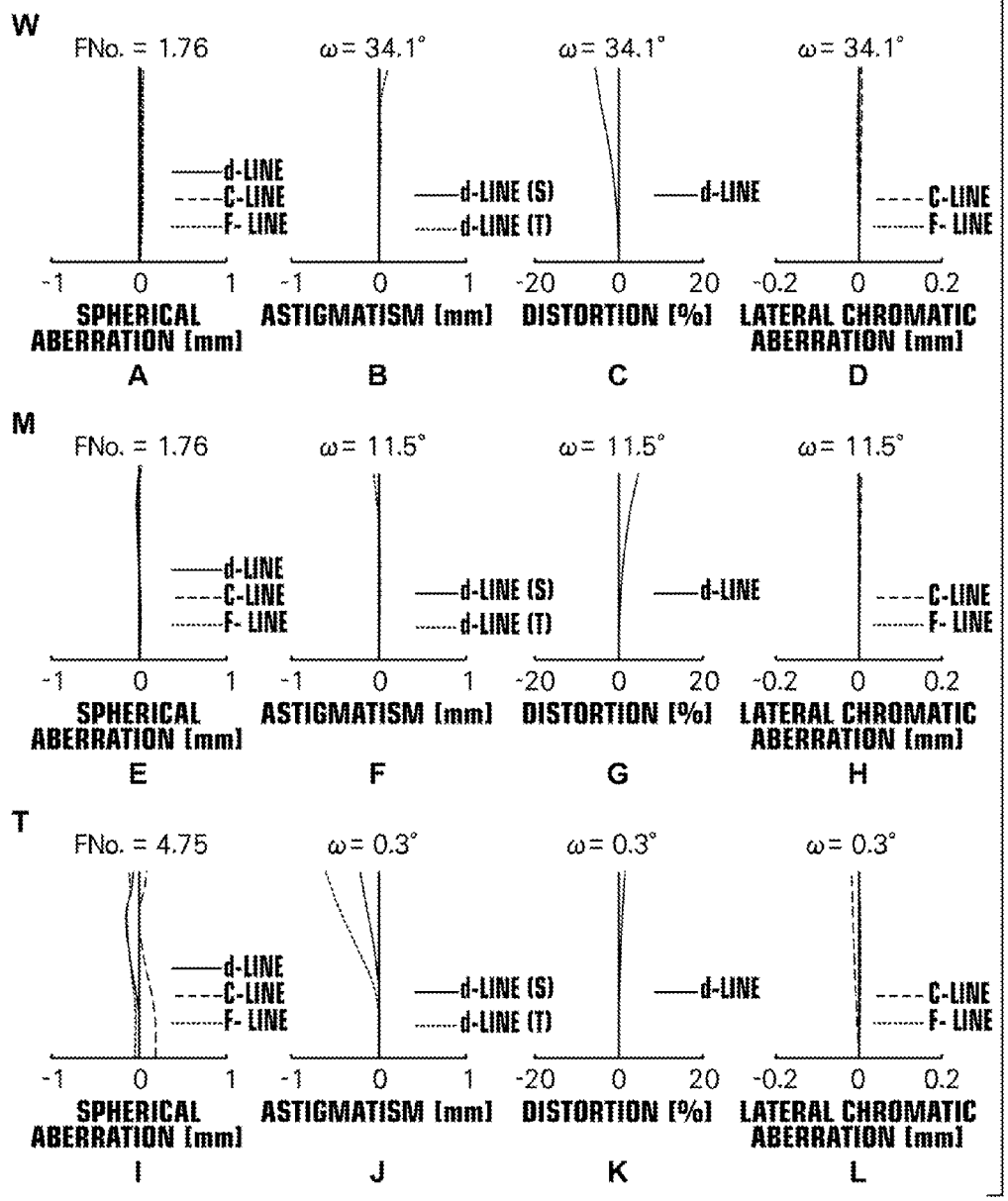

A to L of FIG. 13 show each aberration diagram of the zoom lens of Example 5.

Figure 14:
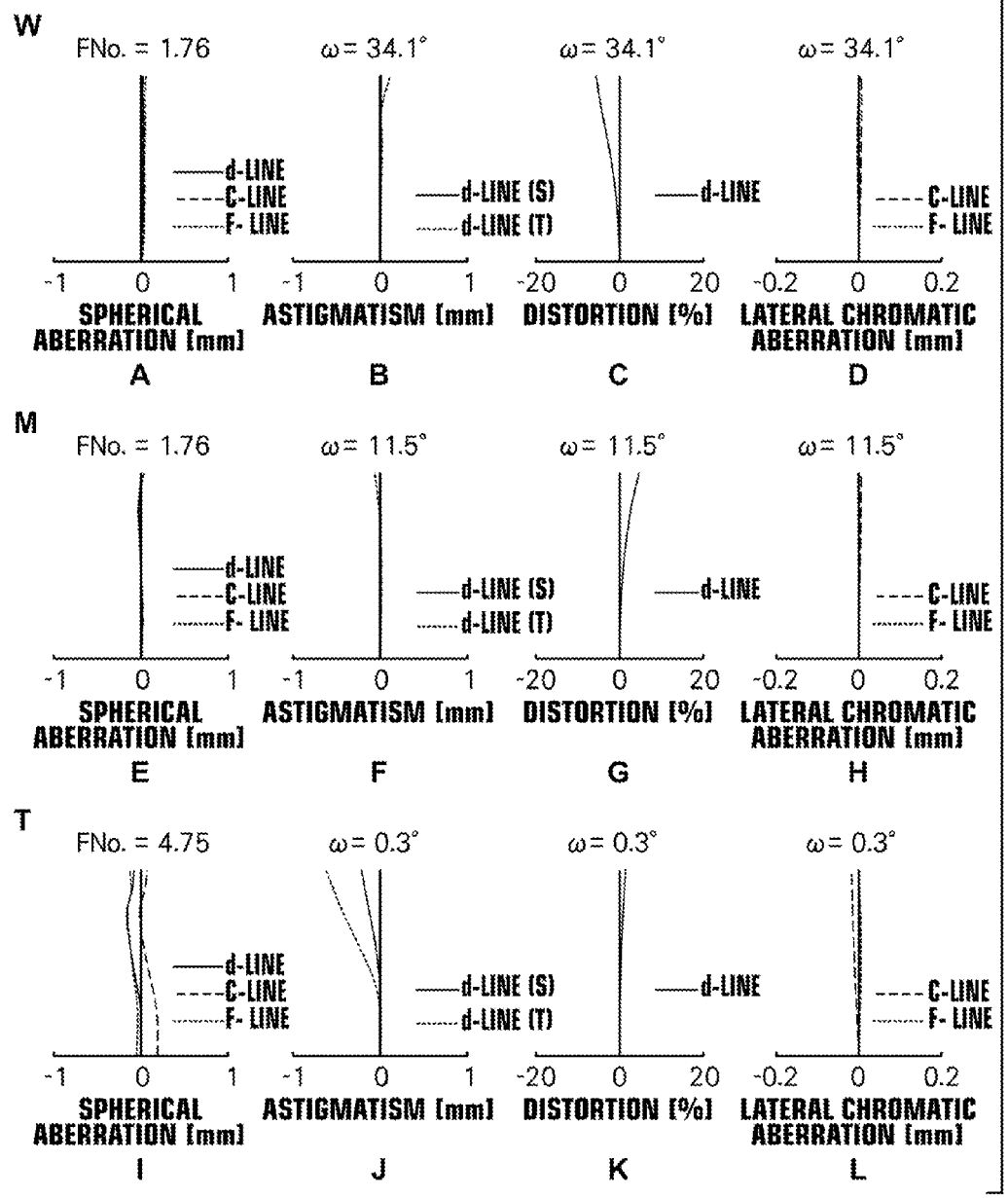

A to L of FIG. 14 show each aberration diagram of the zoom lens of Example 6.

Figure 15:
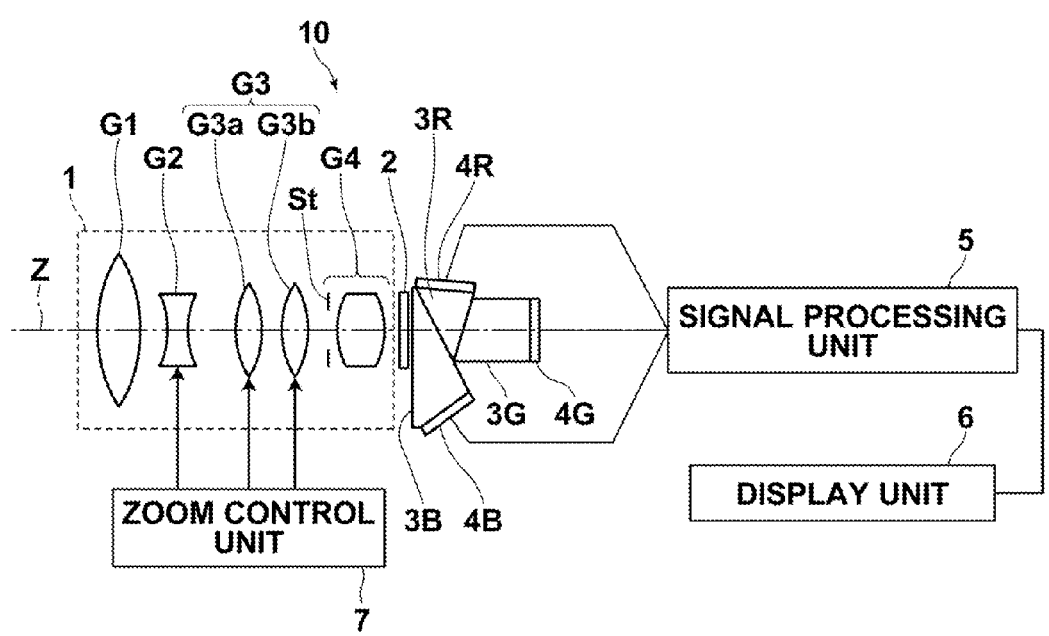

FIG. 15 is a schematic configuration diagram of an imaging apparatus according to an embodiment of the present invention.

DESCRIPTION OF EMBODIMENTS

Figure 1:
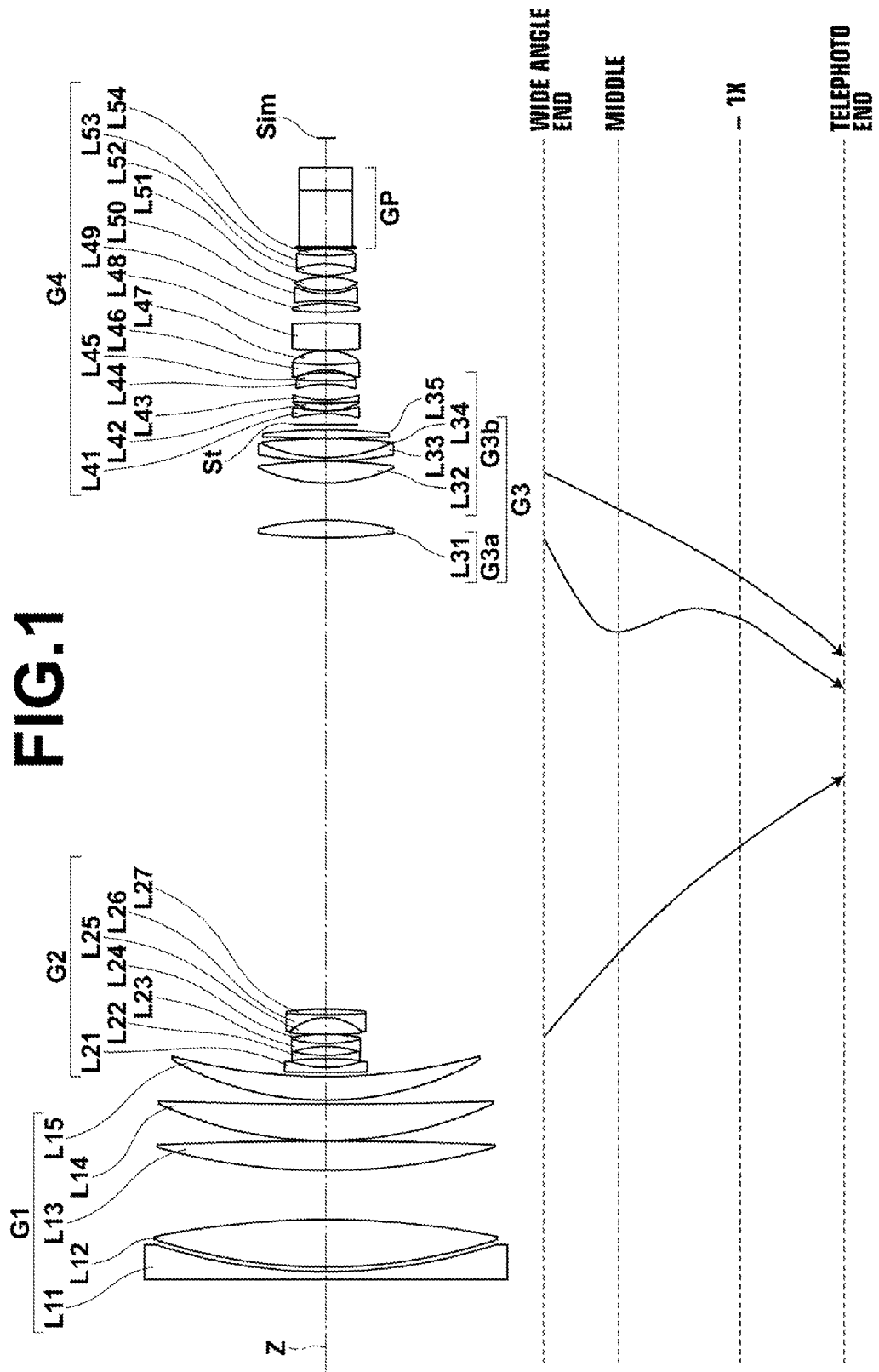
FIG. 1 is a cross-sectional view of a zoom lens according to one embodiment of the present invention, illustrating a lens configuration thereof.

Hereinafter, embodiments of the present invention will be described in detail with reference to the accompanying drawings. A cross-sectional view of a zoom lens according to one embodiment of the present invention at the wide angle end is shown in FIG. 1. FIG. 1 also schematically illustrates moving trajectories of lens groups moved during zooming by arrows below the cross-sectional view in addition to the positional relationships at the wide angle end, middle focal length position, position where the imaging magnification of each of the second lens group G2 and the third lens group G3 is −1×, and telephoto end.

Figure 2:
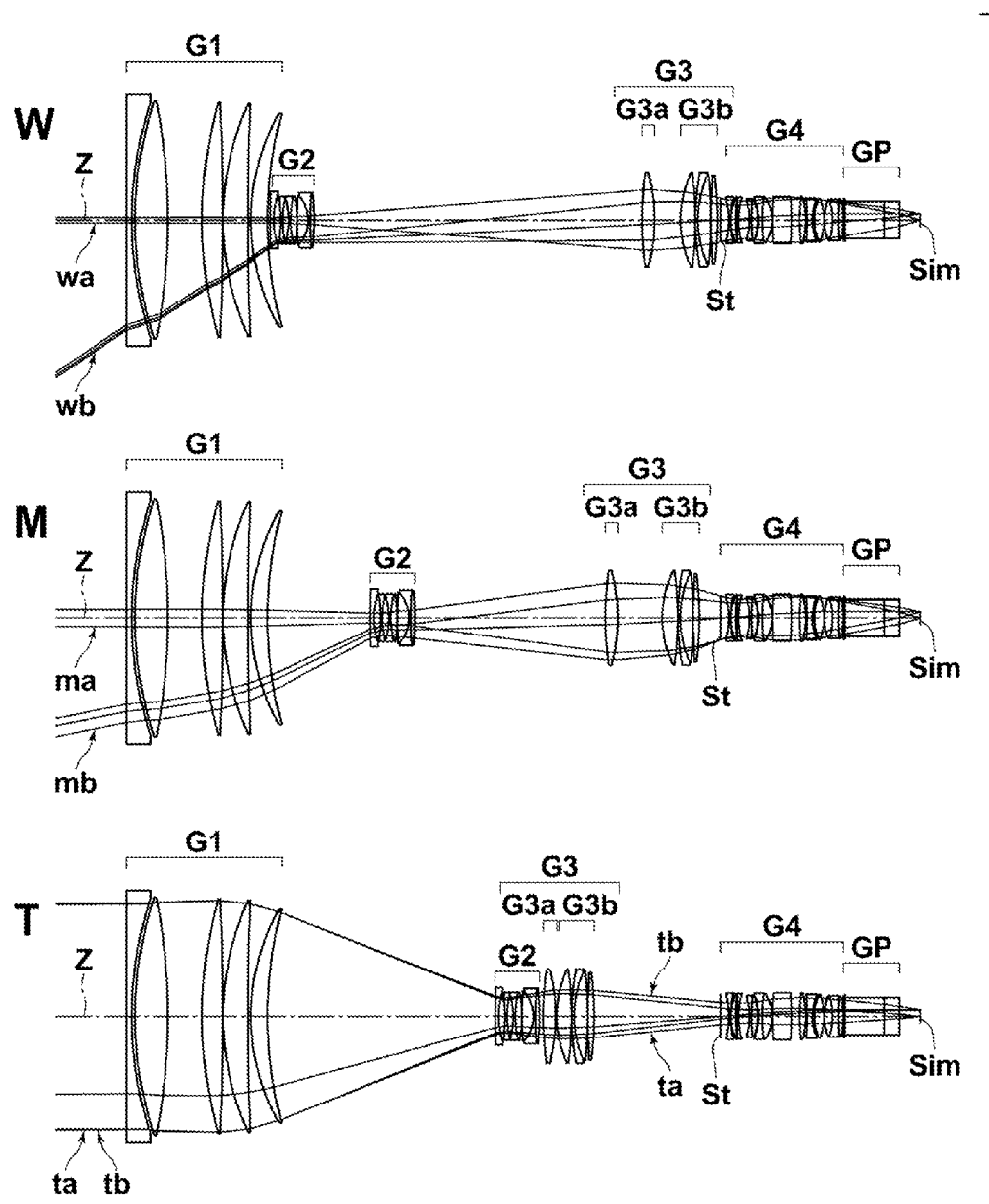
FIG. 2 is a view illustrating a lens configuration of the zoom lens of FIG. 1 and optical paths at each zoom position.

The disposition of each lens group of the zoom lens of FIG. 1 at each zoom position is illustrated in FIG. 2. In FIG. 2, states of the zoom lens at the wide angle end, middle focal length position, and telephoto end are illustrated in the upper, middle, and lower sides denoted by the symbols "W", "M", and "T" on the left side respectively. FIG. 2 also shows an axial light beam "wa" and a maximum angle of view light beam "wb" at the wide angle end, an axial light beam "ma" and a maximum angle of view light beam "mb" at the middle focal length position, and an axial light beam "ta" and a maximum angle of view light beam "tb" at the telephoto end. In FIGS. 1 and 2, the left side is the object side and the right side is the image side. The example shown in FIGS. 1 and 2 corresponds to Example 1, to be described later.

In a case where the zoom lens is mounted on an imaging apparatus, it is preferable that the imaging apparatus is configured to include a cover glass for protecting imaging surface of the image sensor, prisms, such as a color separation prism and the like, according to the specifications of the imaging apparatus, various types of filters, including a low-pass filter, an infrared cut filter, and the like. FIGS. 1 and 2 show an example in which an optical member GP assuming these is disposed between the lens system and the image plane Sim.

The zoom lens of the present embodiment consists essentially of four lens groups, composed of a first lens group G1 having a positive refractive power and being fixed during zooming, a second lens group G2 having a negative refractive power and being moved during zooming, a third lens group G3 having a positive refractive power and being moved during zooming to correct an image plane variation due to the zooming, and a fourth lens group G4 having a positive refractive power and being fixed during zooming, in order from the object side along the optical axis Z. The second lens group G2 has a zoom function, the third lens group G3 has a function to correct the image plane varied by zooming, and the fourth lens group G4 has an image forming effect. An aperture stop St is disposed on the most object side in the fourth lens group G4. Note that the aperture stop St shown in FIGS. 1 and 2 does not necessarily represent the size or shape but the position on the optical axis.

The zoom lens of the present embodiment is a four-group type in which positive, negative, positive, and positive lens groups are disposed in order from the object side. In zoom lenses for television cameras, a type in which the third lens group has a negative refractive power, i.e., a four-group type in which positive, negative, negative, and positive lens groups are disposed in order from the object side is also conceivable. But, in a four-group type in which the third lens group is positive as in the present embodiment, a light beam incident on the third lens group at the telephoto end spreads wider than in a four-group type of positive, negative, negative, and positive in order from the object side, and it makes it easier to correct chromatic aberration which could not be corrected by the first lens group at the telephoto end, i.e., the residual chromatic aberration which is problematic in realizing a higher magnification. Further, in the four-group type of positive, negative, negative, and positive in order from the object side, a light beam incident on the fourth lens group becomes a divergent light beam, causing the lens diameter or the weight of the fourth lens group, in which a vibration-proof group or an extender unit is often provided, to be undesirably increased.

The zoom lens of the present embodiment is configured such that the second lens group G2 and the third lens group G3 each pass through a point where the imaging magnification of each corresponding lens group is −1× at the same time during zooming from the wide angle end to the telephoto end.

In order to realize a high magnification, for example, a magnification of 50× or more, the second lens group G2 having a negative refractive power and the third lens group G3 having a positive refractive power each need to pass through a point of −1× (inverted unit-magnification) at the same time during zooming. Because, if configured in this way, the third lens group G3 having a function of compensator performs not only the image plane correction but also involves in zooming itself, causing a reduced magnification on the wide angle side and an enlarged magnification on the telephoto side with reference to the position of −1×, whereby a large zoom ratio may be obtained.

Further, the zoom lens of the present embodiment is configured such that the second lens group G2 includes at least two positive lenses and at least one negative lens. For example, the second lens group G2 of the example shown in FIG. 1 is composed of a negative lens L21 with a concave surface on the image side, a negative lens L22, a negative lens L23, a positive lens L24, a positive lens L25 with a convex surface on the image side, a negative lens L26, and a positive lens L27, in order from the object side. The lenses L22, L23, and L26 are biconcave lenses, and the lenses L24 and L27 are biconvex lenses. The lens L23 and the lens L24 are cemented. The lens L25, the lens L26, and the lens L27 are cemented to form a three-element cemented lens.

Then, when the d-line Abbe number and the partial dispersion ratio between the g-line and the F-line of one positive lens included in the second lens group are taken as νp and Pp respectively, the zoom lens of the present embodiment is configured to satisfy conditional expressions (1) and (2) given below:

$$75.00 < \nu p \quad (1)$$

$$0.520 < Pp < 0.550 \quad (2)$$

where, νp and Pp are defined, when the refractive indices of the positive lens related to the conditional expressions (1) and (2) with respect to the g-line (wavelength 435.84 nm), F-line (wavelength 486.13 nm), d-line (wavelength 587.56 nm), and C-line (wavelength 656.27 nm) of the Fraunhofer lines are taken as Ng, NF, Nd, and NC respectively, as νp=(Nd−1)/(NF−NC) and Pp=(Ng−NF)/(NF−NC).

The focal length is increased with increase in magnification and along with the increase in focal length, the correction of chromatic aberration on the telephoto side generally becomes difficult, and a higher performance over the entire zoom range is difficult due to the influence of residual secondary spectrum. In the present embodiment, it is possible to satisfactorily correct longitudinal chromatic aberration on the telephoto side while suppressing lateral chromatic aberration on the wide angle side by disposing a positive lens formed of a material that satisfies the conditional expressions (1) and (2) in the second lens group G2, in particular, it is possible to satisfactorily correct longitudinal chromatic aberration with respect to blue light having a large variation on the telephoto side, and a higher performance over the entire zoom range may be realized easily.

Falling to or below the lower limit of the conditional expression (1) is undesirable because the correction effect of the lateral chromatic aberration on the wide angle side is decreased, in addition to the generation of high order chromatic aberrations in spherical aberration on the telephoto side. Falling to or below the lower limit of the conditional expression (2) is undesirable because the longitudinal chromatic aberration with respect to blue light on the telephoto side is over-corrected. Conversely, reaching to or exceeding the upper limit of the conditional expression (2) is undesirable because the longitudinal chromatic aberration with respect to blue light on the telephoto side is under-corrected.

In a zoom lens system in which positive, negative, positive, and positive lens groups are disposed in order from the object side, it is possible to satisfactorily correct chromatic aberration which is problematic in realizing a higher magnification, a longer focal length, a wider angle of view, and a higher performance over the entire zoom range by disposing a positive lens that satisfies the conditional expressions (1) and (2) in the second lens group having a zoom function, whereby a higher magnification, a wider angle of view, and a higher performance over the entire zoom range may be realized simultaneously.

Preferably, the second lens group G2 includes, on the most image side, a three-element cemented lens in which three lenses of a positive lens, a negative lens, and a positive lenses are cemented in order from the object side. The use of a positive lens, a negative lens, and a positive lens as the first to the third lenses from the image side in the second lens group G2 in this way is advantageous for correcting longitudinal chromatic aberration on the telephoto side, whereby high order chromatic aberrations may be corrected easily.

With respect to the positive lens, negative lens, and positive lens disposed in the first to the third from the image side in the second lens group G2, a configuration may be conceivable in which each lens is disposed as a single lens with an air space therebetween instead of being cemented for increasing freedom, but the second lens group G2 has a strong refractive power as it is the only one negative lens group in the entire system and each lens tends to have a high sensitivity. In a case where each lens is a single lens, in particular, the sensitivity of the air space between the lenses to the back focus is large, which is highly likely the cause of a focal position shift during zooming. Therefore, cementing these three lenses may reduce the focal position shift during zooming by reducing error factors.

In the case where the foregoing three-element cemented lens is disposed on the most image side in the second lens group G2, the positive lens that satisfies the conditional expressions (1) and (2) preferably constitutes the three-element cemented lens. The inclusion of the positive lens made of a material that satisfies the conditional expressions (1) and (2) in the three-element cemented lens allows chromatic aberration to be corrected more effectively, whereby a variation in lateral chromatic aberration due to zooming and longitudinal chromatic aberration on the telephoto side may be suppressed.

Preferably, the second lens group G2 includes a cemented lens on the most image side and satisfies a conditional expression (3) given below when the focal length of the cemented lens and the focal length of the second lens group G2 are taken as f2cem and f2 respectively:

$$1.00 < |f2cem/f2| < 44.00 \quad (3).$$

Falling to or below the lower limit of the conditional expression (3) is undesirable, because the power of the cemented lens on the most image side in the second lens group G2 is increased and the correction effect of longitudinal chromatic aberration on the telephoto side is increased excessively. Further, falling to or below the lower limit of the conditional expression (3) is also undesirable, because the powers of the lenses constituting the cemented lens are increased and the thickness of the cemented lens is increased, whereby a sufficient zoom stroke cannot be obtained. Reaching to or exceeding the upper limit of the conditional expression (3) is undesirable, because the power of the cemented lens is reduced and the absolute value of the radius of curvature of each cementing surface is increased, whereby the chromatic aberration correction effect is reduced. A higher magnification may be achieved while maintaining a good balance among aberrations of the entire system by satisfying the conditional expression (3).

In order to further enhance the effect obtained when each of the conditional expressions (1) to (3) is satisfied, it is preferable that each of conditional expressions (1') to (3') given below is satisfied, instead of each of the conditional expressions (1) to (3):

$$80.00 < \nu p \quad (1')$$

$$0.530 < Pp < 0.540 \quad (2')$$

$$3.00 < |f2cem/f2| < 42.00 \quad (3').$$

Preferably, both the first and second lenses from the object side in the second lens group G2 are single lenses having a negative refractive power and the object side surface of the most object side negative lens in the second lens group G2 is aspherical. In the example shown in FIG. 1, the lenses L21 and L22 are negative single lenses and the object side surface of the lens L21 is aspherical.

The second lens group G2 tends to receive a light ray having a large angle from the first lens group G1 on the wide angle side and lateral chromatic aberration is likely to occur. For example, it may be conceivable that the lenses L21 and L22 shown in FIG. 1 are substituted by one negative lens, but, in such a case, the burden of the power of the one substituted negative lens is increased and the absolute value of the radius of curvature of the image side surface of the lens is reduced, whereby the air space to the lens disposed immediately following this lens on the image side is increased. If the air space is increased, the difference in principal point position due to the wavelength is increased, thereby causing lateral chromatic aberration. Therefore, in the example shown in FIG. 1, two negative lenses are disposed as the first and second lenses from the object side in the second lens group G2 to divide the power, thereby reducing the difference in principal point position due to the wavelength and suppressing lateral chromatic aberration. Further, the introduction of an aspherical surface on the object side surface of the most object side negative lens in the second lens group G2 allows distortion to be corrected satisfactorily.

Preferably, the third lens group G3 is composed of a third-a lens group G3a having a positive refractive power and a third-b lens group G3b having a positive refractive power, in order from the object side, and the third-a lens group G3a and the third-b lens group G3b are configured to be moved independently during zooming from the wide angle end to the telephoto end.

In trying to achieve a wider angle of view, a peripheral light beam incident on the second lens group G2 is changed largely as zooming is performed from the wide angle end to the telephoto end, as shown in FIG. 2, and it is difficult to secure the image circle. Therefore, it is possible to secure the image circle by employing a floating system in which the third lens group G3 is divided into two lens groups and each divided lens group is moved independently. In addition, it is easier to correct distortion and to shift the focal length where an axial light beam starts to be vignetted by the most object side lens in the entire system (so-called ramping point) to the long focal point side.

For example, the third lens group G3 of the example shown in FIG. 1 is composed of a positive lens L31, a positive lens L32, a negative lens L33, a positive lens L34, and a positive lens L35, in order from the object side, in which the lens L31 constitutes the third-a lens group G3a, while the lenses L32 to L35 constitute the third-b lens group G3b. The lenses L31, L32, L34, and L35 are biconvex lenses, and the lens L33 is a negative meniscus lens.

The first lens group G1 of the example shown in FIG. 1 is composed of a negative lens L11 with a concave surface on the image side, a positive lens L12, a positive lens L13, a positive lens L14, and a positive lens L15, in order from the object side. The lenses L12 and L13 are biconvex lenses. The lenses L14 and L15 are positive meniscus lenses with convex surfaces on the object side.

The fourth lens group G4 of the example shown in FIG. 1 is composed of fourteen lenses of L41 to L54 in order from the object side. Note that other numbers of lenses constituting each lens group and lens shapes than those of the example shown in FIG. 1 may be employed in the zoom lens of the present invention.

The zoom lens of the present embodiment may be applied suitably to a zoom lens of high magnification such as, for example, about 100×. Further, it is possible to achieve a higher magnification, a longer focal point, a wider angle of view, and a higher performance by employing the foregoing preferable configurations, as appropriate. Note that the foregoing preferable configurations may be combined in any manner and are preferably employed selectively, as appropriate, according to the specifications required of the zoom lens.

Next, specific examples of the zoom lens of the present invention will be described.

Example 1

Figure 3:
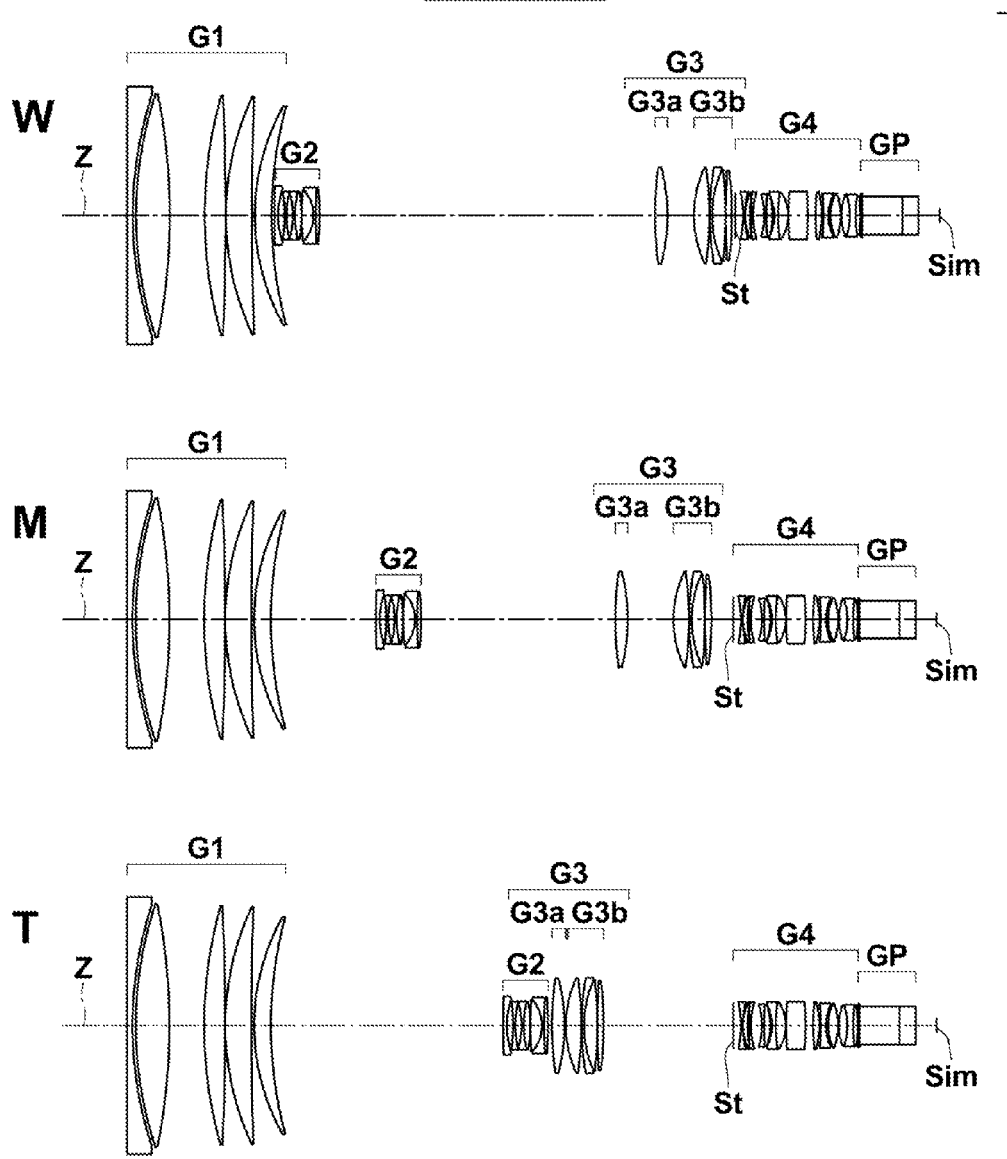
FIG. 3 is a cross-sectional view of a zoom lens of Example 1 of the present invention, illustrating a lens configuration thereof.

A cross-sectional view illustrating a configuration of the zoom lens of Example 1 is shown in FIG. 3. In FIG. 3, the dispositions and configurations of each lens group at the wide angle end, middle focal length position, and telephoto end are illustrated in the upper side, middle, and lower side denoted by the symbols "W", "M", and "T" on the left side respectively.

The schematic configuration of the zoom lens of Example 1 is as follows. That is, the zoom lens of Example 1 consists of a first lens group having a positive refractive power, a second lens group G2 having a negative refractive power, a third lens group G3 having a positive refractive power, and a fourth lens group G4 having a positive refractive power, in order from the object side. An aperture stop St is disposed on the most object side in the fourth lens group G4. Note that the aperture stop St shown in FIG. 3 does not necessarily represent the size or shape but the position on the optical axis. FIG. 3 shows an example in which an optical member GP assuming various filters, a cover glass, and the like, is disposed between the fourth lens group G4 and the image plane Sim.

The zoom lens is configured such that the first lens group G1 and the fourth lens group G4 are fixed with respect to the image plane Sim, while the second lens group G2 and third lens group G3 are moved along the optical axis Z during zooming from the wide angle end to the telephoto end. The zoom lens is also configured such that the second lens group G2 and third lens group G3 each pass through a point where the imaging magnification of each corresponding lens group is −1× at the same time during zooming from the wide angle end to the telephoto end.

The first lens group G1 consists of five single lenses, composed of lenses L11 to L15, in order from the object side. The second lens group G2 consists of seven lenses, composed of a lens L21 having a negative refractive power in the paraxial region, a negative lens L22, a negative lens L23, a positive lens L24, a positive lens L25, a negative lens L26, and a positive lens L27, in order from the object side. The lens L23 and the lens L24 are cemented. The lens L25, the lens L26, and the lens L27 are cemented to form a three-element cemented lens. The object side surface of the lens L21 is aspherical.

The third lens group G3 consists of a third-a lens group G3a having a positive refractive power and a third-b lens group G3b having a positive refractive power, in order from the object side, in which the third-a lens group G3a is composed of a Lens L31, while the third-b lens group consists of four lenses, composed of lenses L32 to L35, in order from the object side. The third-a lens group G3a and the third-b lens group G3b are configured to be moved independently during zooming from the wide angle end to the telephoto end. The fourth lens group G4 consists of fourteen lenses, composed of lenses L41 to L54, in order from the object side.

Basic lens data, aspherical surface coefficients, and specifications and variable surface distances of the zoom lens of Example 1 are shown in Tables 1 to 3 respectively.

TABLE 1

| Si | Ri | Di | Ndj | vdj | PgFj |
|---|---|---|---|---|---|
| 1 | ∞ | 4.40 | 1.80610 | 40.92 | 0.57019 |
| 2 | 329.4288 | 2.75 | | | |
| 3 | 327.9049 | 27.71 | 1.43387 | 95.20 | 0.53733 |
| 4 | −519.9793 | 28.53 | | | |
| 5 | 375.1318 | 17.19 | 1.43387 | 95.20 | 0.53733 |
| 6 | −2354.7227 | 0.24 | | | |
| 7 | 238.1920 | 21.42 | 1.43387 | 95.20 | 0.53733 |
| 8 | 2981.4944 | 2.21 | | | |
| 9 | 187.9318 | 13.82 | 1.43875 | 94.93 | 0.53433 |
| 10 | 355.3859 | DD[10] | | | |
| *11 | 2034.8099 | 3.00 | 2.00069 | 25.46 | 0.61364 |
| 12 | 64.8862 | 5.26 | | | |
| 13 | −153.8771 | 1.70 | 2.00100 | 29.13 | 0.59952 |
| 14 | 78.5292 | 5.27 | | | |
| 15 | −65.0621 | 1.70 | 1.81600 | 46.62 | 0.55682 |
| 16 | 86.4276 | 5.36 | 1.80809 | 22.76 | 0.63073 |
| 17 | −121.5230 | 0.15 | | | |
| 18 | 374.6331 | 9.61 | 1.80809 | 22.76 | 0.63073 |
| 19 | −32.3533 | 1.70 | 1.88300 | 40.76 | 0.56679 |
| 20 | 343.3222 | 3.29 | 1.49700 | 81.54 | 0.53748 |
| 21 | −217.9557 | DD[21] | | | |
| 22 | 293.8511 | 10.22 | 1.59282 | 68.63 | 0.54414 |
| *23 | −153.8414 | DD[23] | | | |
| 24 | 94.1270 | 12.75 | 1.43875 | 94.93 | 0.53433 |
| 25 | −290.2545 | 0.14 | | | |
| 26 | 221.8007 | 2.00 | 1.84661 | 23.78 | 0.62072 |
| 27 | 92.9228 | 10.95 | 1.43875 | 94.93 | 0.53433 |
| 28 | −376.4955 | 0.14 | | | |
| *29 | 417.3468 | 5.19 | 1.43875 | 94.93 | 0.53433 |
| 30 | −304.3989 | DD[30] | | | |
| 31(Stop) | ∞ | 6.49 | | | |
| 32 | −84.5181 | 1.50 | 1.77250 | 49.60 | 0.55212 |
| 33 | 81.5615 | 0.12 | | | |
| 34 | 44.3984 | 4.13 | 1.80518 | 25.42 | 0.61616 |
| 35 | 127.9390 | 0.79 | | | |
| 36 | 285.7866 | 1.50 | 1.48749 | 70.23 | 0.53007 |
| 37 | 66.3416 | 9.28 | | | |
| 38 | −58.0145 | 1.80 | 1.80400 | 46.58 | 0.55730 |
| 39 | 291.7968 | 4.88 | 1.80518 | 25.43 | 0.61027 |
| 40 | −59.6049 | 1.48 | | | |
| 41 | −38.0748 | 3.10 | 1.88300 | 40.76 | 0.56679 |
| 42 | 152.1500 | 8.39 | 1.51633 | 64.14 | 0.53531 |
| 43 | −34.7990 | 0.12 | | | |
| 44 | 265.2565 | 15.81 | 1.77250 | 49.60 | 0.55212 |
| 45 | −343.2292 | 6.38 | | | |
| 46 | 174.6503 | 5.10 | 1.80400 | 46.58 | 0.55730 |
| 47 | −80.2596 | 1.57 | | | |
| 48 | −162.3941 | 3.92 | 1.88300 | 40.76 | 0.56679 |
| 49 | 42.0265 | 1.80 | | | |
| 50 | 43.5739 | 8.18 | 1.51633 | 64.14 | 0.53531 |
| 51 | −55.4107 | 0.67 | | | |
| 52 | 52.8859 | 6.98 | 1.48749 | 70.23 | 0.53007 |
| 53 | −52.8859 | 4.81 | 1.88300 | 40.76 | 0.56679 |
| 54 | 147.8073 | 3.87 | 1.51633 | 64.14 | 0.53531 |
| 55 | −96.6937 | 0.25 | | | |
| 56 | ∞ | 1.00 | 1.51633 | 64.14 | 0.53531 |
| 57 | ∞ | 33.00 | 1.60863 | 46.60 | 0.56787 |
| 58 | ∞ | 13.20 | 1.51633 | 64.14 | 0.53531 |
| 59 | ∞ | 17.36 | | | |

TABLE 2

| Si | 11 | 23 | 29 |
|---|---|---|---|
| KA | 3.3621357E+03 | −4.5249977E+00 | −4.1672124E+02 |
| A3 | 1.0198997E−06 | 4.7598325E−07 | 3.3967323E−07 |
| A4 | −4.4411578E−07 | −5.4675255E−08 | 6.8520980E−07 |
| A5 | 4.0344077E−07 | 5.9923632E−09 | −6.1567433E−08 |
| A6 | −1.0645537E−07 | −4.1046487E−09 | 4.4393760E−09 |
| A7 | 2.0674828E−08 | 6.8505388E−10 | −2.3833737E−10 |
| A8 | −2.7163012E−09 | −6.3049044E−11 | 2.8299879E−12 |

TABLE 2-continued

| Si | 11 | 23 | 29 |
|---|---|---|---|
| A9 | 2.1012880E−10 | 3.4633972E−12 | 3.2383974E−13 |
| A10 | −6.6279144E−12 | −1.0055721E−13 | −9.8689258E−15 |
| A11 | −2.2019042E−13 | 5.2185134E−16 | −2.4650259E−16 |
| A12 | 2.2835291E−14 | 5.1713949E−17 | 8.5375369E−18 |
| A13 | −3.6451674E−16 | −1.2591343E−18 | 1.0862177E−19 |
| A14 | −8.8297936E−18 | 2.3388291E−20 | 8.0782000E−21 |
| A15 | −1.5560014E−19 | −1.6160877E−21 | −6.3457404E−22 |
| A16 | 6.7199046E−21 | 5.5432755E−23 | 4.4561787E−24 |
| A17 | 1.3975034E−21 | −4.6223330E−25 | 3.1912417E−25 |
| A18 | −6.4181548E−23 | −1.3273114E−26 | −7.0148474E−27 |
| A19 | 7.8647667E−25 | 3.1954023E−28 | 4.6920880E−29 |
| A20 | 0.0000000E+00 | −2.0317793E−30 | −8.8192713E−32 |

TABLE 3

| | Wide Angle End | Middle | Telephoto End |
|---|---|---|---|
| Zoom Ratio | 1.0 | 3.0 | 106.0 |
| f | 8.58 | 25.73 | 909.22 |
| Bf | 46.58 | 46.58 | 46.58 |
| FNo. | 1.76 | 1.76 | 4.74 |
| 2ω[°] | 68.8 | 23.2 | 0.6 |
| DD[10] | 2.28 | 86.55 | 191.04 |
| DD[21] | 275.02 | 159.79 | 3.20 |
| DD[23] | 21.68 | 37.58 | 1.08 |
| DD[30] | 2.78 | 17.85 | 106.45 |

In Table 1, the Si column indicates the $i^{th}$ surface number in which a number i (i=1, 2, 3, - - -) is given to each surface in a serially increasing manner toward the image side with the object side surface of the most object side constituent element being taken as the first surface. The Ri column indicates the radius of curvature of the $i^{th}$ surface and the Di column indicates the surface distance on the optical axis Z between the $i^{th}$ surface and the $(i+1)^{th}$ surface. The Ndj column indicates the refractive index of the $j^{th}$ lens with respect to the d-line (wavelength of 587.6 nm) in which a number j (j=1, 2, 3, - - -) is given to each lens in a serially increasing manner toward the image side with the most object side lens being taken as the first lens, the vdj column indicates the Abbe number of the $j^{th}$ lens with respect to the d-line, and the PgFj column indicates the partial dispersion ratio between the g-line and the F-line of the $j^{th}$ lens.

The sign of the radius of curvature is positive if the surface shape is convex on the object side and negative if it is convex on the image side. The value at the bottom of the Di column is the distance between the image side surface of the optical member GP and the image plane Sim. Note that the aperture stop St and the optical member GP are also included in the basic lens data. The surface number column corresponding to the aperture stop St includes the word (Stop) in addition to the surface number. A mark "*" is attached to the surface number of an aspherical surface and a numerical value of the paraxial radius of curvature is indicated in the radius of curvature column of the aspherical surface.

Table 2 shows aspherical surface coefficients of each aspherical surface of Example 1. "E−n" (n: integer) in the values of aspherical surface coefficients in Table 2 refers to "×10$^{−n}$". The aspherical surface coefficients are the values of each of coefficients KA and Am (m=3, 4, 5, - - - ) in an aspherical surface expression represented by a formula given below.

$$Zd=C\cdot h^2/\{1+(1-KA\cdot C^2\cdot h^2)^{1/2}\}\Sigma Am\cdot h^m$$

where,

Zd: depth of aspherical surface (length of vertical line extended from a point on the aspherical surface at height h to a flat surface orthogonal to the optical axis to which the aspherical apex contacts)

h: height (distance from the optical axis)

C: paraxial curvature

KA, Am: aspherical surface coefficients (m=3, 4, 5, - - - ).

In Table 1, those described as DD[10], DD[21], DD[23], and DD[30] in the surface distance column are variable surface distances which vary during zooming. DD[10] is the distance between the first lens group G1 and the second lens group G2, DD[21] is the distance between the second lens group G2 and the third-a lens group G3a, DD[23] is the distance between the third-a lens group G3a and the third-b lens group G3b, and DD[30] is the distance between the third-b lens group G3b and the fourth lens group G4.

Specifications and values of the variable surface distances at each of the wide angle end, middle focal length position, and the telephoto end are shown in Table 3. The f, Bf, FNo. and 2ω in Table 3 are focal length of the entire system, back focus (air equivalent distance), F-number, and total angle of view (in degrees) respectively.

Tables 1 to 3 show values rounded to a predetermined digit. In Tables 1 to 3, "mm" is used as the unit of length, but other appropriate units may also be used, as optical systems can be used by proportionally enlarged or reduced.

A to D of FIG. 9 respectively show aberration diagrams of spherical aberration, astigmatism, distortion, and lateral chromatic aberration of the zoom lens of Example 1 at the wide angle end. E to H of FIG. 9 respectively show aberration diagrams of spherical aberration, astigmatism, distortion, and lateral chromatic aberration of the zoom lens of Example 1 at the middle focal length position, and I to L of FIG. 9 respectively show aberration diagrams of spherical aberration, astigmatism, distortion, and lateral chromatic aberration of the zoom lens of Example 1 at the telephoto end. All of A to L of FIG. 9 are those when focus is on an object at infinity. The symbols "W", "M", and "T" attached to the left of the upper side, middle, and lower side of FIG. 9 refer to wide angle end, middle focal length position, and telephoto end respectively.

Each aberration diagram shows aberration with the d-line as the reference wavelength. But, the spherical aberration diagram also shows aberrations with respect to the C-line and the F-line, and the lateral chromatic aberration diagram shows aberrations with respect to the C-line and the F-line. The astigmatism diagram shows aberrations in the sagittal direction and the tangential direction by the solid line and the broken line respectively, and the symbols "(S)" and "(T)" are attached to the explanatory notes of the line types respectively. The "FNo." in the spherical aberration refers to the F-number and "w" in the other aberration diagrams refers to the half angle of view.

The symbols, their meanings, and representation methods in each of the data described in Example 1 above are applicable to the following examples unless otherwise specifically described and a duplicated explanation will be omitted below.

Example 2

Figure 4:
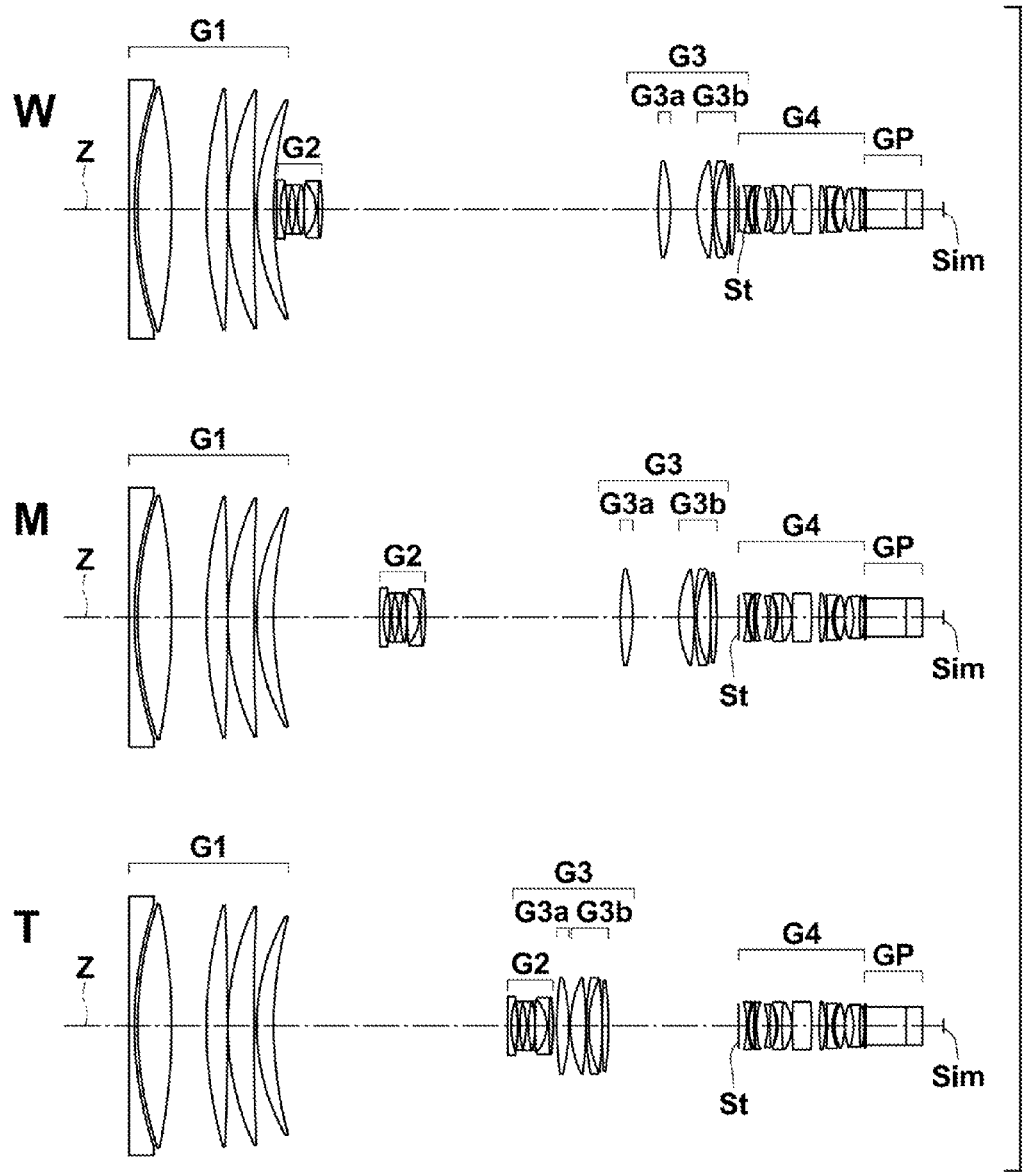
FIG. 4 is a cross-sectional view of a zoom lens of Example 2 of the present invention, illustrating a lens configuration thereof.

A lens configuration of the zoom lens of Example 2 is shown in FIG. 4. The schematic configuration of the zoom lens of Example 2 is almost the same as that of the zoom lens of Example 1 described above. Basic lens data, aspherical surface coefficients, and specifications and variable surface distances are shown in Tables 4, 5, and 6 respectively. Each aberration diagram of the zoom lens of Example 2 is shown in each of A to L of FIG. 10.

TABLE 4

| Si | Ri | Di | Ndj | vdj | PgFj |
|---|---|---|---|---|---|
| 1 | ∞ | 4.40 | 1.80610 | 40.92 | 0.57019 |
| 2 | 330.2432 | 2.74 | | | |
| 3 | 329.0564 | 27.63 | 1.43387 | 95.20 | 0.53733 |
| 4 | −523.2689 | 28.42 | | | |
| 5 | 375.3508 | 17.32 | 1.43387 | 95.20 | 0.53733 |
| 6 | −2369.9337 | 0.15 | | | |
| 7 | 238.1740 | 21.54 | 1.43387 | 95.20 | 0.53733 |
| 8 | 2957.3815 | 2.11 | | | |
| 9 | 187.6246 | 13.91 | 1.43875 | 94.93 | 0.53433 |
| 10 | 355.8756 | DD[10] | | | |
| *11 | 2009.1027 | 3.00 | 2.00069 | 25.46 | 0.61364 |
| 12 | 64.8352 | 5.31 | | | |
| 13 | −153.7976 | 1.70 | 2.00100 | 29.13 | 0.59952 |
| 14 | 78.5585 | 5.34 | | | |
| 15 | −64.9986 | 1.70 | 1.81600 | 46.62 | 0.55682 |
| 16 | 85.8120 | 5.35 | 1.80809 | 22.76 | 0.63073 |
| 17 | −121.5185 | 0.15 | | | |
| 18 | 373.3074 | 9.61 | 1.80809 | 22.76 | 0.63073 |
| 19 | −32.3230 | 1.70 | 1.88300 | 40.76 | 0.56679 |
| 20 | 346.0700 | 3.40 | 1.43875 | 94.93 | 0.53433 |
| 21 | −180.2335 | DD[21] | | | |
| 22 | 292.4479 | 9.95 | 1.59282 | 68.63 | 0.54414 |
| *23 | −153.8499 | DD[23] | | | |
| 24 | 94.0952 | 12.71 | 1.43875 | 94.93 | 0.53433 |
| 25 | −291.4572 | 0.12 | | | |
| 26 | 221.2826 | 2.00 | 1.84661 | 23.78 | 0.62072 |
| 27 | 93.0370 | 10.93 | 1.43875 | 94.93 | 0.53433 |
| 28 | −378.3589 | 0.14 | | | |
| *29 | 417.7491 | 5.20 | 1.43875 | 94.93 | 0.53433 |
| 30 | −305.7029 | DD[30] | | | |
| 31(Stop) | ∞ | 6.48 | | | |
| 32 | −84.9426 | 1.50 | 1.77250 | 49.60 | 0.55212 |
| 33 | 81.6251 | 0.12 | | | |
| 34 | 44.3458 | 4.13 | 1.80518 | 25.42 | 0.61616 |
| 35 | 127.0445 | 0.80 | | | |
| 36 | 290.7222 | 1.50 | 1.48749 | 70.23 | 0.53007 |
| 37 | 66.1323 | 9.25 | | | |
| 38 | −58.1369 | 1.80 | 1.80400 | 46.58 | 0.55730 |
| 39 | 293.8000 | 4.91 | 1.80518 | 25.43 | 0.61027 |
| 40 | −59.8023 | 1.47 | | | |
| 41 | −38.1502 | 3.14 | 1.88300 | 40.76 | 0.56679 |
| 42 | 152.7000 | 8.40 | 1.51633 | 64.14 | 0.53531 |
| 43 | −34.8207 | 0.12 | | | |
| 44 | 264.2199 | 15.83 | 1.77250 | 49.60 | 0.55212 |
| 45 | −344.0208 | 6.40 | | | |
| 46 | 174.3642 | 5.16 | 1.80400 | 46.58 | 0.55730 |
| 47 | −80.2772 | 1.63 | | | |
| 48 | −162.5091 | 4.01 | 1.88300 | 40.76 | 0.56679 |
| 49 | 42.0043 | 1.80 | | | |
| 50 | 43.5624 | 8.20 | 1.51633 | 64.14 | 0.53531 |
| 51 | −55.4215 | 0.12 | | | |
| 52 | 52.9060 | 7.00 | 1.48749 | 70.23 | 0.53007 |
| 53 | −52.9060 | 4.87 | 1.88300 | 40.76 | 0.56679 |
| 54 | 147.2700 | 3.99 | 1.51633 | 64.14 | 0.53531 |
| 55 | −96.8939 | 0.25 | | | |
| 56 | ∞ | 1.00 | 1.51633 | 64.14 | 0.53531 |
| 57 | ∞ | 33.00 | 1.60863 | 46.60 | 0.56787 |
| 58 | ∞ | 13.20 | 1.51633 | 64.14 | 0.53531 |
| 59 | ∞ | 17.38 | | | |

TABLE 5

| Si | 11 | 23 | 29 |
|---|---|---|---|
| KA | 3.3621357E+03 | −4.5249977E+00 | −4.1672124E+02 |
| A3 | 1.1238908E−06 | 3.9718407E−07 | 2.0947716E−07 |
| A4 | −4.3960025E−07 | −5.4535585E−08 | 6.8512791E−07 |
| A5 | 4.0363327E−07 | 5.9958141E−09 | −6.1562695E−08 |
| A6 | −1.0644984E−07 | −4.1044204E−09 | 4.4406201E−09 |
| A7 | 2.0674918E−08 | 6.8505897E−10 | −2.3831978E−10 |
| A8 | −2.7163017E−09 | −6.3048957E−11 | 2.8307483E−12 |
| A9 | 2.1012867E−10 | 3.4633915E−12 | 3.2383366E−13 |
| A10 | −6.6279291E−12 | −1.0055795E−13 | −9.8708052E−15 |
| A11 | −2.2019064E−13 | 5.2184541E−16 | −2.4651234E−16 |
| A12 | 2.2835264E−14 | 5.1715109E−17 | 8.5343115E−18 |
| A13 | −3.6451604E−16 | −1.2591040E−18 | 1.0885132E−19 |
| A14 | −8.8297805E−18 | 2.3384326E−20 | 8.0773580E−21 |
| A15 | −1.5559886E−19 | −1.6161103E−21 | −6.3458666E−22 |
| A16 | 6.7199372E−21 | 5.5435135E−23 | 4.4531606E−24 |
| A17 | 1.3975047E−21 | −4.6210501E−25 | 3.1910790E−25 |
| A18 | −6.4181502E−23 | −1.3270463E−26 | −7.0129246E−27 |
| A19 | 7.8647891E−25 | 3.1921471E−28 | 4.6948138E−29 |
| A20 | 0.0000000E+00 | −2.0273111E−30 | −8.9083703E−32 |

TABLE 6

| | Wide Angle End | Middle | Telephoto End |
|---|---|---|---|
| Zoom Ratio | 1.0 | 3.0 | 106.0 |
| f' | 8.58 | 25.73 | 909.09 |
| Bf' | 46.60 | 46.60 | 46.60 |
| FNo. | 1.76 | 1.76 | 4.74 |
| 2ω[°] | 68.6 | 23.2 | 0.6 |
| DD[10] | 2.39 | 86.62 | 191.08 |
| DD[21] | 274.72 | 159.54 | 3.00 |
| DD[23] | 21.82 | 37.72 | 1.22 |
| DD[30] | 2.79 | 17.84 | 106.42 |

Example 3

Figure 5:
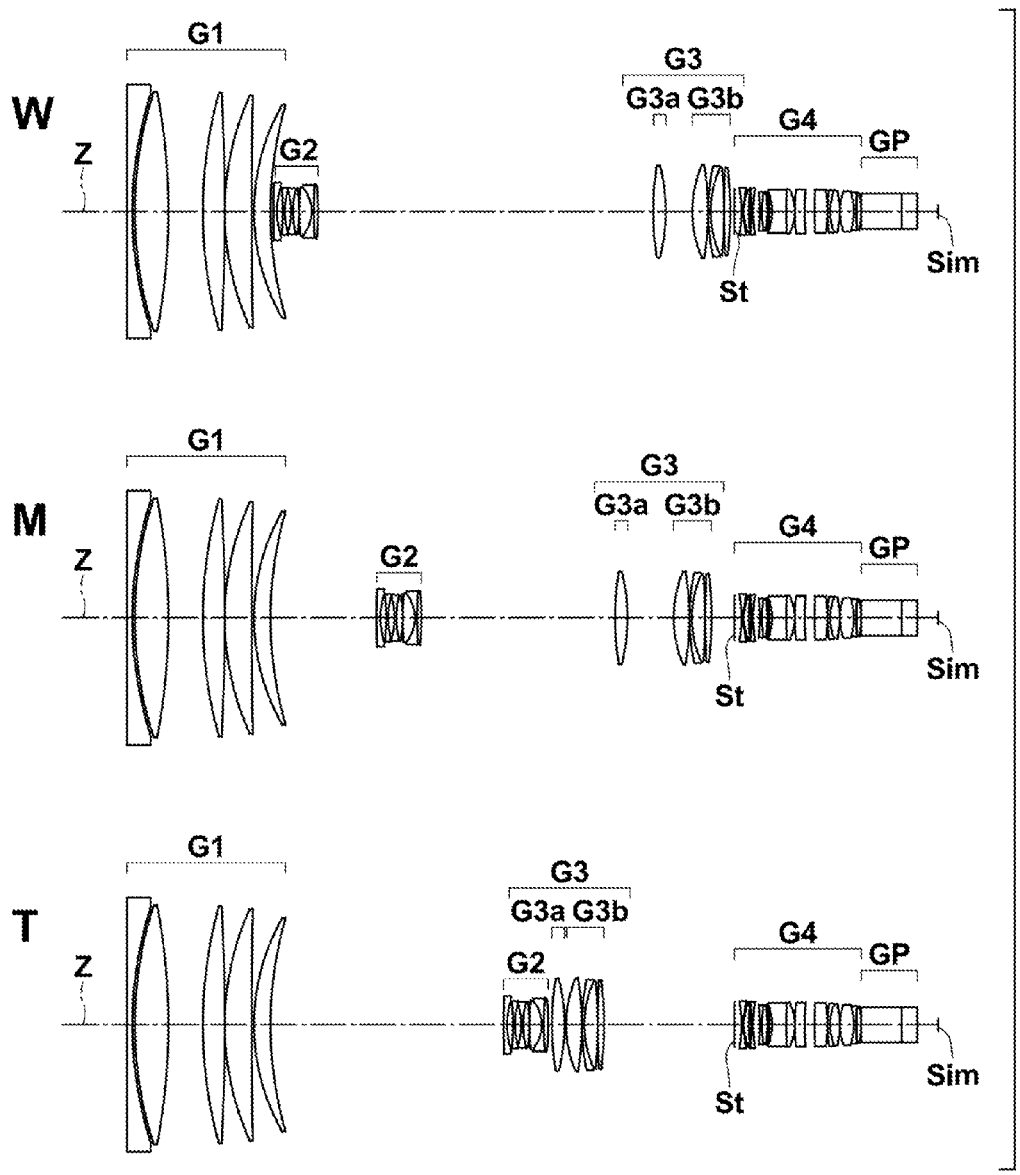
FIG. 5 is a cross-sectional view of a zoom lens of Example 3 of the present invention, illustrating a lens configuration thereof.

A lens configuration of the zoom lens of Example 3 is shown in FIG. 5. The schematic configuration of the zoom lens of Example 3 is almost the same as that of the zoom lens of Example 1 described above, but differs in that the fourth lens group G4 is composed of fifteen lenses. Basic lens data, aspherical surface coefficients, and specifications and variable surface distances are shown in Tables 7, 8, and 9 respectively. Each aberration diagram of the zoom lens of Example 3 is shown in each of A to L of FIG. 11.

TABLE 7

| Si | Ri | Di | Ndj | vdj | PgFj |
|---|---|---|---|---|---|
| 1 | ∞ | 4.40 | 1.80610 | 40.92 | 0.57019 |
| 2 | 328.8977 | 1.99 | | | |
| 3 | 327.1430 | 27.60 | 1.43387 | 95.20 | 0.53733 |
| 4 | −540.0057 | 28.25 | | | |
| 5 | 376.4233 | 17.94 | 1.43387 | 95.20 | 0.53733 |
| 6 | −1950.0867 | 0.12 | | | |
| 7 | 239.6376 | 21.92 | 1.43387 | 95.20 | 0.53733 |
| 8 | 4035.8640 | 2.00 | | | |
| 9 | 182.9057 | 13.60 | 1.43875 | 94.93 | 0.53433 |
| 10 | 328.6815 | DD[10] | | | |
| *11 | 1587.0993 | 3.00 | 2.00069 | 25.46 | 0.61364 |
| 12 | 69.0361 | 4.75 | | | |
| 13 | −187.9133 | 1.70 | 2.00100 | 29.13 | 0.59952 |
| 14 | 68.1672 | 5.01 | | | |
| 15 | −63.9740 | 1.70 | 1.81600 | 46.62 | 0.55682 |
| 16 | 82.0296 | 5.05 | 1.80809 | 22.76 | 0.63073 |
| 17 | −138.6713 | 0.15 | | | |
| 18 | 266.5834 | 9.99 | 1.80809 | 22.76 | 0.63073 |
| 19 | −32.0545 | 1.70 | 1.88300 | 40.76 | 0.56679 |
| 20 | 272.0837 | 3.67 | 1.49700 | 81.54 | 0.53748 |
| 21 | −200.9914 | DD[21] | | | |
| 22 | 240.1245 | 10.36 | 1.49700 | 81.54 | 0.53748 |
| *23 | −150.8379 | DD[23] | | | |
| 24 | 98.2037 | 12.92 | 1.43875 | 94.93 | 0.53433 |
| 25 | −243.5649 | 0.17 | | | |
| 26 | 186.0161 | 2.00 | 1.84661 | 23.78 | 0.62072 |
| 27 | 89.5685 | 10.87 | 1.43875 | 94.93 | 0.53433 |
| 28 | −446.2924 | 0.12 | | | |
| *29 | 422.5699 | 5.11 | 1.43875 | 94.93 | 0.53433 |
| 30 | −313.0904 | DD[30] | | | |
| 31(Stop) | ∞ | 6.03 | | | |

TABLE 7-continued

| Si | Ri | Di | Ndj | vdj | PgFj |
|---|---|---|---|---|---|
| 32 | −95.9950 | 1.50 | 1.80400 | 46.58 | 0.55730 |
| 33 | 76.8998 | 0.12 | | | |
| 34 | 41.9087 | 4.25 | 1.80518 | 25.42 | 0.61616 |
| 35 | 124.3678 | 1.96 | | | |
| 36 | −357.2109 | 1.50 | 1.48749 | 70.23 | 0.53007 |
| 37 | 102.9035 | 5.69 | | | |
| 38 | −121.5327 | 1.60 | 1.90366 | 31.32 | 0.59481 |
| 39 | 100.8035 | 4.63 | 1.84666 | 23.83 | 0.61603 |
| 40 | −76.4526 | 1.60 | 1.81600 | 46.62 | 0.55682 |
| 41 | −83.0694 | 2.11 | | | |
| 42 | −44.8372 | 11.99 | 1.88300 | 40.76 | 0.56679 |
| 43 | 775.8208 | 6.68 | 1.51633 | 64.14 | 0.53531 |
| 44 | −41.9317 | 0.12 | | | |
| 45 | 223.5953 | 7.77 | 1.60562 | 43.70 | 0.57214 |
| 46 | 161.1286 | 8.32 | | | |
| 47 | 679.4308 | 10.68 | 1.61772 | 49.81 | 0.56035 |
| 48 | −113.2234 | 0.12 | | | |
| 49 | 146.6183 | 2.00 | 1.88300 | 40.76 | 0.56679 |
| 50 | 48.1149 | 7.74 | 1.48749 | 70.23 | 0.53007 |
| 51 | −83.5966 | 0.26 | | | |
| 52 | 50.6175 | 11.37 | 1.48749 | 70.23 | 0.53007 |
| 53 | −54.9825 | 2.00 | 1.88300 | 40.76 | 0.56679 |
| 54 | 195.6559 | 0.32 | | | |
| 55 | 268.4637 | 3.82 | 1.49700 | 81.54 | 0.53748 |
| 56 | −72.4115 | 0.00 | | | |
| 57 | ∞ | 33.00 | 1.60863 | 46.60 | 0.56787 |
| 58 | ∞ | 13.20 | 1.51633 | 64.14 | 0.53531 |
| 59 | ∞ | 17.07 | | | |

TABLE 8

| Si | 11 | 23 | 29 |
|---|---|---|---|
| KA | 3.3252521E+03 | −4.6572753E+00 | −3.9394264E+02 |
| A3 | −5.6336669E−07 | 2.0263484E−07 | −7.5493220E−08 |
| A4 | 1.2171265E−06 | −2.3702270E−08 | 6.4416173E−07 |
| A5 | −3.9415141E−07 | 3.5710683E−09 | −7.7915588E−08 |
| A6 | 1.2266778E−07 | −3.8873876E−09 | 8.2769381E−09 |
| A7 | −2.4122431E−08 | 5.8058528E−10 | −6.5254776E−10 |
| A8 | 3.2745287E−09 | −4.4410445E−11 | 2.5533043E−11 |
| A9 | −3.1263093E−10 | 1.9503780E−12 | −2.2821146E−13 |
| A10 | 1.9798752E−11 | −5.1541287E−14 | −7.0607476E−15 |
| A11 | −6.9266985E−13 | 1.4274283E−15 | −3.0707887E−16 |
| A12 | 4.5219375E−15 | −6.6658454E−17 | 1.3890002E−17 |
| A13 | 4.4736692E−16 | 1.8123010E−18 | 2.6766802E−19 |
| A14 | −1.6502323E−17 | −6.0932303E−22 | −3.9869525E−21 |
| A15 | 1.5803491E−18 | −5.6983649E−22 | −3.4484053E−22 |
| A16 | −9.0796334E−20 | −7.2005099E−24 | −3.2989831E−24 |
| A17 | −1.1707134E−21 | 1.6452424E−25 | 3.8224985E−25 |
| A18 | 2.6976624E−22 | 1.4188172E−26 | −5.6596907E−28 |
| A19 | −8.7739493E−24 | −4.0271562E−28 | −1.4548479E−28 |
| A20 | 9.2976070E−26 | 3.0081524E−30 | 1.4793724E−30 |

TABLE 9

| | Wide Angle End | Middle | Telephoto End |
|---|---|---|---|
| Zoom Ratio | 1.0 | 3.0 | 106.0 |
| f | 8.58 | 25.75 | 909.74 |
| Bf | 46.29 | 46.29 | 46.29 |
| FNo. | 1.76 | 1.76 | 4.73 |
| 2ω[°] | 68.6 | 23.2 | 0.6 |
| DD[10] | 2.33 | 87.19 | 191.29 |
| DD[21] | 275.04 | 158.87 | 3.00 |
| DD[23] | 21.73 | 37.66 | 1.16 |
| DD[30] | 3.31 | 18.70 | 106.97 |

Example 4

Figure 6:
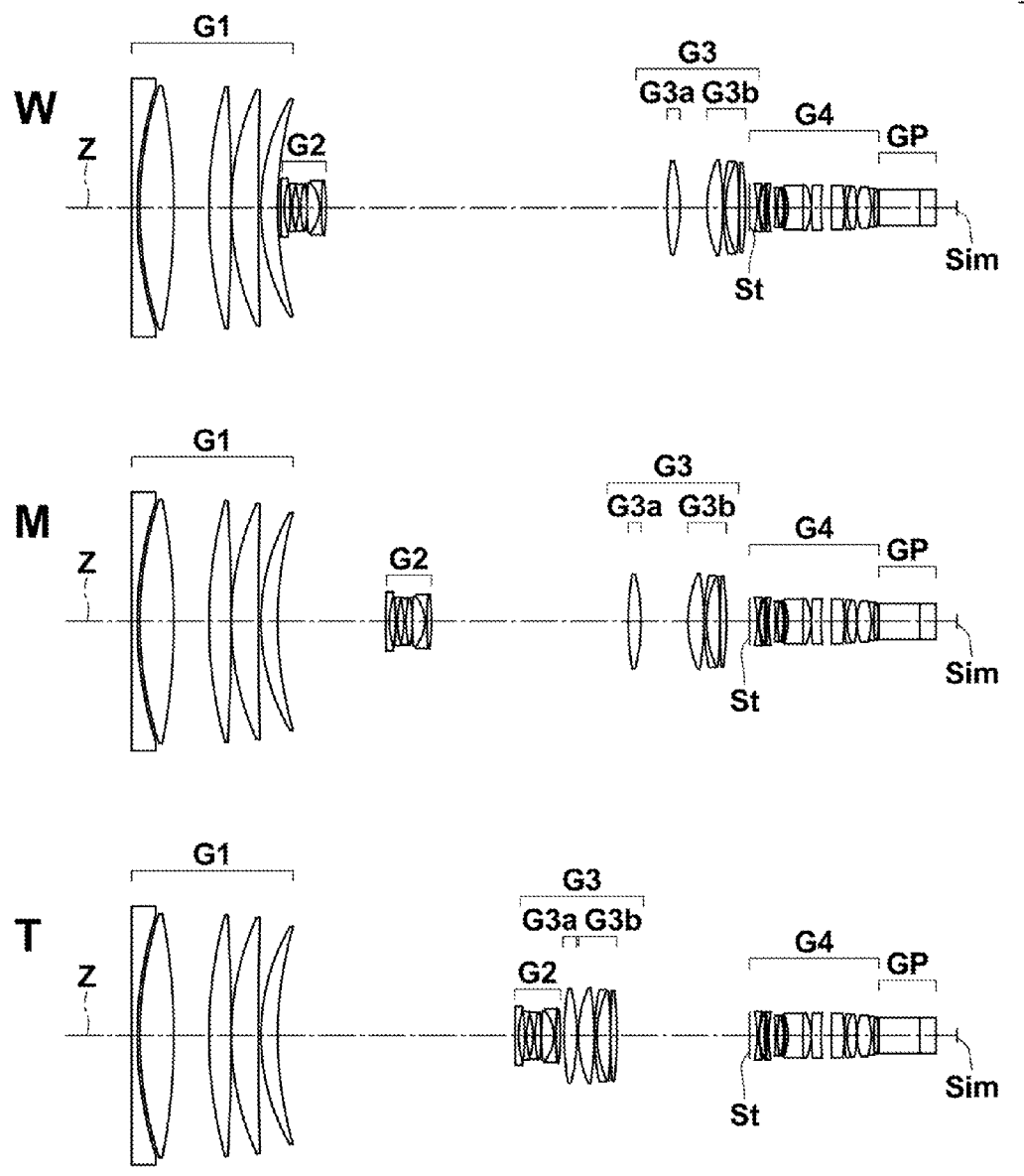
FIG. 6 is a cross-sectional view of a zoom lens of Example 4 of the present invention, illustrating a lens configuration thereof.

A lens configuration of the zoom lens of Example 4 is shown in FIG. 6. The schematic configuration of the zoom lens of Example 4 is almost the same as that of the zoom lens of Example 3 described above. Basic lens data, aspherical surface coefficients, and specifications and variable surface distances are shown in Tables 10, 11, and 12 respectively. Each aberration diagram of the zoom lens of Example 4 is shown in each of A to L of FIG. 12.

TABLE 10

| Si | Ri | Di | Ndj | vdj | PgFj |
|---|---|---|---|---|---|
| 1 | ∞ | 4.40 | 1.80610 | 40.92 | 0.57019 |
| 2 | 330.5663 | 2.01 | | | |
| 3 | 328.4264 | 27.54 | 1.43387 | 95.20 | 0.53733 |
| 4 | −539.4054 | 28.29 | | | |
| 5 | 380.1801 | 17.90 | 1.43387 | 95.20 | 0.53733 |
| 6 | −1877.3923 | 0.12 | | | |
| 7 | 239.3315 | 21.87 | 1.43387 | 95.20 | 0.53733 |
| 8 | 3812.6934 | 2.00 | | | |
| 9 | 182.3842 | 13.57 | 1.43875 | 94.93 | 0.53433 |
| 10 | 326.1546 | DD[10] | | | |
| *11 | 1559.7847 | 3.00 | 2.00069 | 25.46 | 0.61364 |
| 12 | 68.8134 | 4.80 | | | |
| 13 | −189.1356 | 1.70 | 2.00100 | 29.13 | 0.59952 |
| 14 | 68.4857 | 5.06 | | | |
| 15 | −63.7897 | 1.70 | 1.81600 | 46.62 | 0.55682 |
| 16 | 82.0052 | 5.04 | 1.80809 | 22.76 | 0.63073 |
| 17 | −139.4418 | 0.15 | | | |
| 18 | 265.7902 | 9.98 | 1.80809 | 22.76 | 0.63073 |
| 19 | −32.0727 | 1.70 | 1.88300 | 40.76 | 0.56679 |
| 20 | 283.0369 | 3.66 | 1.43875 | 94.93 | 0.53433 |
| 21 | −167.1315 | DD[21] | | | |
| 22 | 236.8248 | 10.36 | 1.49700 | 81.54 | 0.53748 |
| *23 | −152.1283 | DD[23] | | | |
| 24 | 98.3202 | 12.87 | 1.43875 | 94.93 | 0.53433 |
| 25 | −246.4785 | 0.17 | | | |
| 26 | 185.5498 | 2.00 | 1.84661 | 23.78 | 0.62072 |
| 27 | 89.8155 | 10.85 | 1.43875 | 94.93 | 0.53433 |
| 28 | −449.0452 | 0.12 | | | |
| *29 | 420.4908 | 5.12 | 1.43875 | 94.93 | 0.53433 |
| 30 | −313.2924 | DD[30] | | | |
| 31(Stop) | ∞ | 6.08 | | | |
| 32 | −96.3160 | 1.50 | 1.80400 | 46.58 | 0.55730 |
| 33 | 77.0984 | 0.12 | | | |
| 34 | 41.9288 | 4.25 | 1.80518 | 25.42 | 0.61616 |
| 35 | 124.0588 | 1.98 | | | |
| 36 | −351.6831 | 1.50 | 1.48749 | 70.23 | 0.53007 |
| 37 | 102.3595 | 5.67 | | | |
| 38 | −121.2197 | 1.60 | 1.90366 | 31.32 | 0.59481 |
| 39 | 101.8565 | 4.62 | 1.84666 | 23.83 | 0.61603 |
| 40 | −76.6070 | 1.60 | 1.81600 | 46.62 | 0.55682 |
| 41 | −82.6284 | 2.11 | | | |
| 42 | −44.8058 | 12.02 | 1.88300 | 40.76 | 0.56679 |
| 43 | 727.5163 | 6.68 | 1.51633 | 64.14 | 0.53531 |
| 44 | −41.8714 | 0.12 | | | |
| 45 | 225.1660 | 7.73 | 1.60562 | 43.70 | 0.57214 |
| 46 | 162.3721 | 8.31 | | | |
| 47 | 688.0353 | 10.73 | 1.61772 | 49.81 | 0.56035 |
| 48 | −112.6818 | 0.12 | | | |
| 49 | 146.8679 | 2.00 | 1.88300 | 40.76 | 0.56679 |
| 50 | 48.0615 | 7.77 | 1.48749 | 70.23 | 0.53007 |
| 51 | −83.1564 | 0.21 | | | |
| 52 | 50.6175 | 11.36 | 1.48749 | 70.23 | 0.53007 |
| 53 | −55.1348 | 2.00 | 1.88300 | 40.76 | 0.56679 |
| 54 | 196.4771 | 0.36 | | | |
| 55 | 272.9155 | 3.81 | 1.49700 | 81.54 | 0.53748 |
| 56 | −72.8686 | 0.00 | | | |
| 57 | ∞ | 33.00 | 1.60863 | 46.60 | 0.56787 |
| 58 | ∞ | 13.20 | 1.51633 | 64.14 | 0.53531 |
| 59 | ∞ | 17.00 | | | |

TABLE 11

| Si | 11 | 23 | 29 |
|---|---|---|---|
| KA | 3.3252521E+03 | −4.6572753E+00 | −3.9394264E+02 |
| A3 | −5.4936671E−07 | 2.0829332E−07 | −3.3712077E−08 |
| A4 | 1.2173449E−06 | −2.3618284E−08 | 6.4427202E−07 |
| A5 | −3.9414841E−07 | 3.5997859E−09 | −7.7952395E−08 |

TABLE 11-continued

| Si | 11 | 23 | 29 |
|---|---|---|---|
| A6 | 1.2266580E−07 | −3.8874205E−09 | 8.2768550E−09 |
| A7 | −2.4122378E−08 | 5.8057595E−10 | −6.5254263E−10 |
| A8 | 3.2745325E−09 | −4.4410138E−11 | 2.5530595E−11 |
| A9 | −3.1263076E−10 | 1.9503776E−12 | −2.2812645E−13 |
| A10 | 1.9798736E−11 | −5.1541320E−14 | −7.0607722E−15 |
| A11 | −6.9267173E−13 | 1.4274263E−15 | −3.0708759E−16 |
| A12 | 4.5218739E−15 | −6.6658208E−17 | 1.3889925E−17 |
| A13 | 4.4736606E−16 | 1.8123057E−18 | 2.6767251E−19 |
| A14 | −1.6502354E−17 | −6.1014267E−22 | −3.9864778E−21 |
| A15 | 1.5803539E−18 | −5.6982451E−22 | −3.4486522E−22 |
| A16 | −9.0796291E−20 | −7.2005139E−24 | −3.2989188E−24 |
| A17 | −1.1707053E−21 | 1.6452436E−25 | 3.8223185E−25 |
| A18 | 2.6976628E−22 | 1.4188180E−26 | −5.6653881E−28 |
| A19 | −8.7739535E−24 | −4.0271550E−28 | −1.4542110E−28 |
| A20 | 9.2975739E−26 | 3.0081584E−30 | 1.4784817E−30 |

TABLE 12

| | Wide Angle End | Middle | Telephoto End |
|---|---|---|---|
| Zoom Ratio | 1.0 | 3.0 | 106.0 |
| f | 8.58 | 25.75 | 909.69 |
| Bf | 46.22 | 46.22 | 46.22 |
| FNo. | 1.76 | 1.76 | 4.73 |
| 2ω[°] | 68.6 | 23.0 | 0.6 |
| DD[10] | 2.35 | 87.24 | 191.38 |
| DD[21] | 275.02 | 158.81 | 2.91 |
| DD[23] | 21.74 | 37.67 | 1.17 |
| DD[30] | 3.31 | 18.70 | 106.97 |

Example 5

Figure 7:
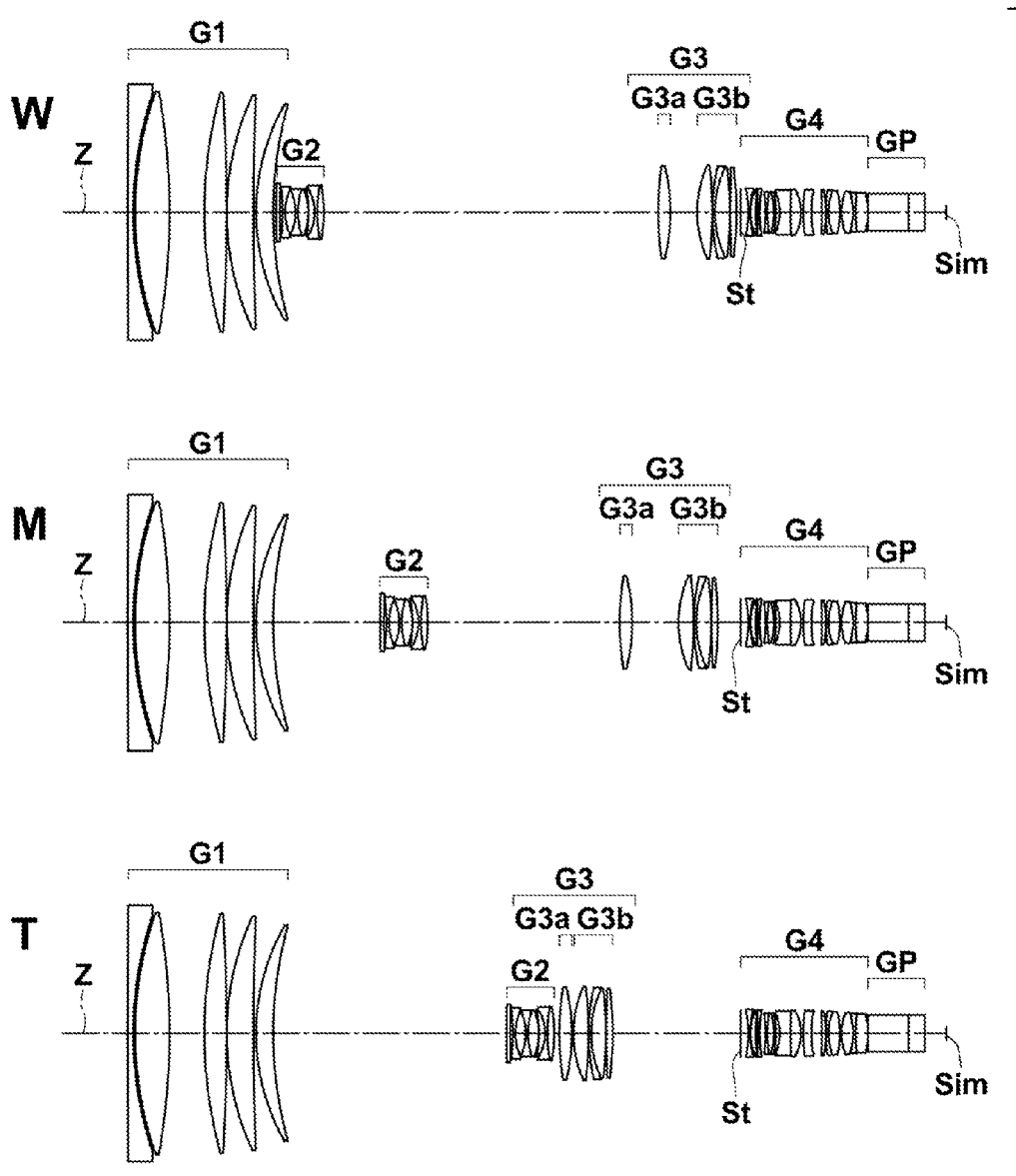
FIG. 7 is a cross-sectional view of a zoom lens of Example 5 of the present invention, illustrating a lens configuration thereof.

A lens configuration of the zoom lens of Example 5 is shown in FIG. 7. The schematic configuration of the zoom lens of Example 5 is almost the same as that of the zoom lens of Example 3 described above. Basic lens data, aspherical surface coefficients, and specifications and variable surface distances are shown in Tables 13, 14, and 15 respectively. Each aberration diagram of the zoom lens of Example 5 is shown in each of A to L of FIG. 13.

TABLE 13

| Si | Ri | Di | Ndj | vdj | PgFj |
|---|---|---|---|---|---|
| 1 | 10652.2673 | 4.40 | 1.80610 | 40.92 | 0.57019 |
| 2 | 312.4593 | 1.50 | | | |
| 3 | 306.9412 | 28.03 | 1.43387 | 95.20 | 0.53733 |
| 4 | −582.6841 | 28.30 | | | |
| 5 | 380.0955 | 18.20 | 1.43387 | 95.20 | 0.53733 |
| 6 | −1692.0117 | 0.12 | | | |
| 7 | 235.0447 | 21.88 | 1.43387 | 95.20 | 0.53733 |
| 8 | 2916.1117 | 2.00 | | | |
| 9 | 183.3952 | 13.96 | 1.43875 | 94.93 | 0.53433 |
| 10 | 338.9552 | DD[10] | | | |
| *11 | −1461.9213 | 3.00 | 2.00069 | 25.46 | 0.61364 |
| 12 | 1251.3787 | 2.20 | | | |
| 13 | −166.2988 | 2.00 | 2.00100 | 29.13 | 0.59952 |
| 14 | 45.4063 | 8.42 | | | |
| 15 | −45.6316 | 2.00 | 1.81600 | 46.62 | 0.55682 |
| 16 | 63.3042 | 8.64 | 1.80809 | 22.76 | 0.63073 |
| 17 | −49.0950 | 0.15 | | | |
| 18 | −90.3224 | 4.88 | 1.49700 | 81.54 | 0.53748 |
| 19 | −37.7511 | 2.00 | 1.88300 | 40.76 | 0.56679 |
| 20 | 116.3210 | 5.46 | 1.80809 | 22.76 | 0.63073 |
| 21 | −130.8925 | DD[21] | | | |
| 22 | 252.3313 | 10.11 | 1.49700 | 81.54 | 0.53748 |
| *23 | −155.6080 | DD[23] | | | |
| 24 | 95.1663 | 12.31 | 1.43875 | 94.93 | 0.53433 |
| 25 | −334.6441 | 0.13 | | | |
| 26 | 175.9140 | 2.00 | 1.84661 | 23.78 | 0.62072 |

TABLE 13-continued

| Si | Ri | Di | Ndj | vdj | PgFj |
|---|---|---|---|---|---|
| 27 | 87.1180 | 12.19 | 1.43875 | 94.93 | 0.53433 |
| 28 | −295.6778 | 0.13 | | | |
| *29 | 415.7195 | 5.28 | 1.43875 | 94.93 | 0.53433 |
| 30 | −291.7099 | DD[30] | | | |
| 31(Stop) | ∞ | 6.13 | | | |
| 32 | −94.0602 | 1.50 | 1.80400 | 46.58 | 0.55730 |
| 33 | 75.8108 | 0.12 | | | |
| 34 | 42.3927 | 4.24 | 1.80518 | 25.42 | 0.61616 |
| 35 | 127.5118 | 1.77 | | | |
| 36 | −515.4666 | 1.50 | 1.48749 | 70.23 | 0.53007 |
| 37 | 105.0167 | 4.62 | | | |
| 38 | −175.8527 | 1.60 | 1.90366 | 31.32 | 0.59481 |
| 39 | 97.9361 | 5.41 | 1.84666 | 23.83 | 0.61603 |
| 40 | −66.3141 | 1.60 | 1.81600 | 46.62 | 0.55682 |
| 41 | −110.9656 | 3.16 | | | |
| 42 | −43.1906 | 8.85 | 1.88300 | 40.76 | 0.56679 |
| 43 | 458.5394 | 8.55 | 1.51633 | 64.14 | 0.53531 |
| 44 | −38.3632 | 1.93 | | | |
| 45 | 164.1587 | 6.48 | 1.60562 | 43.70 | 0.57214 |
| 46 | 98.6753 | 8.40 | | | |
| 47 | −1393.4577 | 3.49 | 1.61772 | 49.81 | 0.56035 |
| 48 | −95.3204 | 0.12 | | | |
| 49 | 151.6154 | 2.00 | 1.88300 | 40.76 | 0.56679 |
| 50 | 49.9555 | 9.21 | 1.48749 | 70.23 | 0.53007 |
| 51 | −79.2591 | 1.40 | | | |
| 52 | 50.6175 | 9.30 | 1.48749 | 70.23 | 0.53007 |
| 53 | −55.6255 | 2.00 | 1.88300 | 40.76 | 0.56679 |
| 54 | 159.5065 | 0.17 | | | |
| 55 | 157.3676 | 9.95 | 1.49700 | 81.54 | 0.53748 |
| 56 | −66.4921 | 0.00 | | | |
| 57 | ∞ | 33.00 | 1.60863 | 46.60 | 0.56787 |
| 58 | ∞ | 13.20 | 1.51633 | 64.14 | 0.53531 |
| 59 | ∞ | 17.72 | | | |

TABLE 14

| Si | 11 | 23 | 29 |
|---|---|---|---|
| KA | 3.3252521E+03 | −4.6572753E+00 | −3.9394264E+02 |
| A3 | −3.4015089E−07 | 3.3242612E−07 | 1.6040130E−07 |
| A4 | 2.1917441E−06 | −2.1927223E−08 | 6.4522464E−07 |
| A5 | −2.6634858E−07 | 2.6414368E−09 | −7.9495748E−08 |
| A6 | 9.8516712E−08 | −3.8871255E−09 | 8.2715547E−09 |
| A7 | −2.1893141E−08 | 5.8077565E−10 | −6.5192460E−10 |
| A8 | 3.2040859E−09 | −4.4407327E−11 | 2.5539160E−11 |
| A9 | −3.1548833E−10 | 1.9505699E−12 | −2.2878619E−13 |
| A10 | 1.9930316E−11 | −5.1535762E−14 | −7.0612982E−15 |
| A11 | −6.8168145E−13 | 1.4274488E−15 | −3.0505184E−16 |
| A12 | 4.1453468E−15 | −6.6654395E−17 | 1.3879269E−17 |
| A13 | 4.1666427E−16 | 1.8124026E−18 | 2.6707343E−19 |
| A14 | −1.4377993E−17 | −6.2280761E−22 | −4.0024011E−21 |
| A15 | 1.5075624E−18 | −5.6953747E−22 | −3.4537623E−22 |
| A16 | −9.0525831E−20 | −7.2321417E−24 | −3.2813930E−24 |
| A17 | −9.8285524E−22 | 1.6464665E−25 | 3.8011022E−25 |
| A18 | 2.6204922E−22 | 1.4214988E−26 | −4.5587644E−28 |
| A19 | −8.7431269E−24 | −4.0282051E−28 | −1.4679809E−28 |
| A20 | 9.4792915E−26 | 3.0025890E−30 | 1.4775927E−30 |

TABLE 15

| | Wide Angle End | Middle | Telephoto End |
|---|---|---|---|
| Zoom Ratio | 1.0 | 3.0 | 106.0 |
| f | 8.61 | 25.84 | 912.95 |
| Bf | 46.94 | 46.94 | 46.94 |
| FNo. | 1.76 | 1.76 | 4.75 |
| 2ω[°] | 68.2 | 23.0 | 0.6 |
| DD[10] | 2.43 | 87.04 | 190.00 |
| DD[21] | 272.19 | 156.46 | 4.37 |
| DD[23] | 21.75 | 37.68 | 1.18 |
| DD[30] | 3.50 | 18.69 | 104.32 |

Example 6

Figure 8:
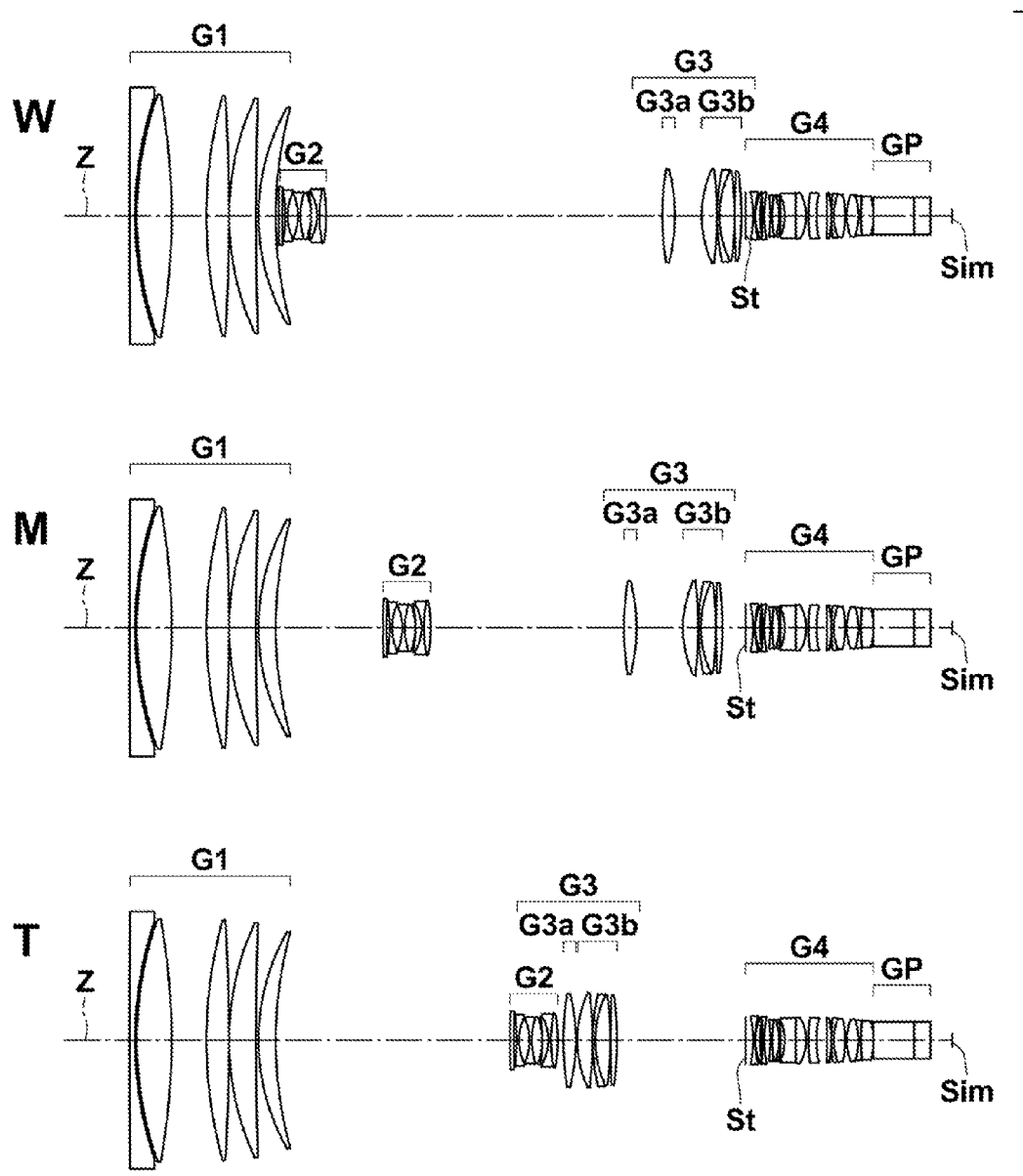
FIG. 8 is a cross-sectional view of a zoom lens of Example 6 of the present invention, illustrating a lens configuration thereof.

A lens configuration of the zoom lens of Example 6 is shown in FIG. 8. The schematic configuration of the zoom lens of Example 6 is almost the same as that of the zoom lens of Example 3 described above. Basic lens data, aspherical surface coefficients, and specifications and variable surface distances are shown in Tables 16, 17, and 18 respectively. Each aberration diagram of the zoom lens of Example 6 is shown in each of A to L of FIG. 14.

TABLE 16

| Si | Ri | Di | Ndj | vdj | PgFj |
|---|---|---|---|---|---|
| 1 | 10654.0479 | 4.40 | 1.80610 | 40.92 | 0.57019 |
| 2 | 312.4587 | 1.50 | | | |
| 3 | 306.9401 | 28.03 | 1.43387 | 95.20 | 0.53733 |
| 4 | −582.7758 | 28.30 | | | |
| 5 | 380.0953 | 18.20 | 1.43387 | 95.20 | 0.53733 |
| 6 | −1692.0620 | 0.12 | | | |
| 7 | 235.0435 | 21.88 | 1.43387 | 95.20 | 0.53733 |
| 8 | 2916.2476 | 2.00 | | | |
| 9 | 183.3979 | 13.96 | 1.43875 | 94.93 | 0.53433 |
| 10 | 338.9414 | DD[10] | | | |
| *11 | −1496.8634 | 3.00 | 2.00069 | 25.46 | 0.61364 |
| 12 | 1161.8196 | 2.25 | | | |
| 13 | −161.5910 | 2.00 | 2.00100 | 29.13 | 0.59952 |
| 14 | 45.5723 | 8.35 | | | |
| 15 | −46.2749 | 2.00 | 1.81600 | 46.62 | 0.55682 |
| 16 | 63.1139 | 8.59 | 1.80809 | 22.76 | 0.63073 |
| 17 | −49.7696 | 0.15 | | | |
| 18 | −99.7383 | 4.72 | 1.43875 | 94.93 | 0.53433 |
| 19 | −39.9689 | 2.00 | 1.88300 | 40.76 | 0.56679 |
| 20 | 113.0925 | 5.49 | 1.80809 | 22.76 | 0.63073 |
| 21 | −131.6298 | DD[21] | | | |
| 22 | 252.3205 | 10.11 | 1.49700 | 81.54 | 0.53748 |
| *23 | −155.6179 | DD[23] | | | |
| 24 | 95.1659 | 12.31 | 1.43875 | 94.93 | 0.53433 |
| 25 | −334.6504 | 0.13 | | | |
| 26 | 175.9101 | 2.00 | 1.84661 | 23.78 | 0.62072 |
| 27 | 87.1190 | 12.19 | 1.43875 | 94.93 | 0.53433 |
| 28 | −295.6746 | 0.13 | | | |
| *29 | 415.6739 | 5.28 | 1.43875 | 94.93 | 0.53433 |
| 30 | −291.7075 | DD[30] | | | |
| 31(Stop) | ∞ | 6.14 | | | |
| 32 | −94.1020 | 1.50 | 1.80400 | 46.58 | 0.55730 |
| 33 | 75.7910 | 0.12 | | | |
| 34 | 42.3854 | 4.25 | 1.80518 | 25.42 | 0.61616 |
| 35 | 127.4754 | 1.77 | | | |
| 36 | −516.2366 | 1.50 | 1.48749 | 70.23 | 0.53007 |
| 37 | 104.9468 | 4.63 | | | |
| 38 | −175.9349 | 1.60 | 1.90366 | 31.32 | 0.59481 |
| 39 | 97.9589 | 5.41 | 1.84666 | 23.83 | 0.61603 |
| 40 | −66.3338 | 1.60 | 1.81600 | 46.62 | 0.55682 |
| 41 | −111.0107 | 3.17 | | | |
| 42 | −43.2034 | 8.85 | 1.88300 | 40.76 | 0.56679 |
| 43 | 457.6874 | 8.55 | 1.51633 | 64.14 | 0.53531 |
| 44 | −38.3659 | 1.93 | | | |
| 45 | 164.1317 | 6.47 | 1.60562 | 43.70 | 0.57214 |
| 46 | 98.6379 | 8.41 | | | |
| 47 | −1394.1035 | 3.48 | 1.61772 | 49.81 | 0.56035 |
| 48 | −95.3471 | 0.12 | | | |
| 49 | 151.6391 | 2.00 | 1.88300 | 40.76 | 0.56679 |
| 50 | 49.9419 | 9.20 | 1.48749 | 70.23 | 0.53007 |
| 51 | −79.2770 | 1.40 | | | |
| 52 | 50.6175 | 9.29 | 1.48749 | 70.23 | 0.53007 |
| 53 | −55.6326 | 2.00 | 1.88300 | 40.76 | 0.56679 |
| 54 | 159.4263 | 0.17 | | | |
| 55 | 157.4521 | 9.95 | 1.49700 | 81.54 | 0.53748 |
| 56 | −66.5060 | 0.00 | | | |
| 57 | ∞ | 33.00 | 1.60863 | 46.60 | 0.56787 |
| 58 | ∞ | 13.20 | 1.51633 | 64.14 | 0.53531 |
| 59 | ∞ | 17.73 | | | |

TABLE 17

| Si | 11 | 23 | 29 |
|---|---|---|---|
| KA | 3.3252521E+03 | −4.6572753E+00 | −3.9394264E+02 |
| A3 | −3.4125051E−07 | 3.3374504E−07 | 1.6124858E−07 |
| A4 | 2.1858092E−06 | −2.1907936E−08 | 6.4521405E−07 |
| A5 | −2.6643031E−07 | 2.6417832E−09 | −7.9495136E−08 |
| A6 | 9.8508225E−08 | −3.8871227E−09 | 8.2715585E−09 |
| A7 | −2.1891376E−08 | 5.8077570E−10 | −6.5192445E−10 |
| A8 | 3.2039733E−09 | −4.4407325E−11 | 2.5539165E−11 |
| A9 | −3.1548546E−10 | 1.9505699E−12 | −2.2878604E−13 |
| A10 | 1.9930083E−11 | −5.1535761E−14 | −7.0612943E−15 |
| A11 | −6.8168613E−13 | 1.4274488E−15 | −3.0505150E−16 |
| A12 | 4.1468004E−15 | −6.6654395E−17 | 1.3879274E−17 |
| A13 | 4.1660735E−16 | 1.8124027E−18 | 2.6707456E−19 |
| A14 | −1.4379295E−17 | −6.2279303E−22 | −4.0024060E−21 |
| A15 | 1.5077834E−18 | −5.6953582E−22 | −3.4537692E−22 |
| A16 | −9.0536748E−20 | −7.2321726E−24 | −3.2814190E−24 |
| A17 | −9.8244290E−22 | 1.6464567E−25 | 3.8011150E−25 |
| A18 | 2.6203815E−22 | 1.4214970E−26 | −4.5586319E−28 |
| A19 | −8.7430191E−24 | −4.0282024E−28 | −1.4679913E−28 |
| A20 | 9.4791656E−26 | 3.0026015E−30 | 1.4776013E−30 |

TABLE 18

| | Wide Angle End | Middle | Telephoto End |
|---|---|---|---|
| Zoom Ratio | 1.0 | 3.0 | 106.0 |
| f | 8.62 | 25.85 | 913.42 |
| Bf | 46.95 | 46.95 | 46.95 |
| FNo. | 1.76 | 1.76 | 4.75 |
| 2ω[°] | 68.2 | 23.0 | 0.6 |
| DD[10] | 2.43 | 87.03 | 189.97 |
| DD[21] | 272.39 | 156.67 | 4.63 |
| DD[23] | 21.75 | 37.68 | 1.18 |
| DD[30] | 3.51 | 18.70 | 104.29 |

Values of the zoom lenses of Examples 1 to 6 corresponding to the conditional expressions (1) to (3) are shown in Table 19. As the values corresponding to the conditional expressions (1) and (2) in Table 19, Examples 1 to 4 show the values of the lens L27 while Examples 5 and 6 show the values of the lens L25. Note that the values corresponding to the conditional expression (3) in Table 19 are with respect to the d-line.

TABLE 19

| Conditional Expression Number | | Example 1 | Example 2 | Example 3 | Example 4 | Example 5 | Example 6 |
|---|---|---|---|---|---|---|---|
| (1) | νp | 81.5 | 94.9 | 81.5 | 94.9 | 81.5 | 94.9 |
| (2) | Pp | 0.5375 | 0.5343 | 0.5375 | 0.5343 | 0.5375 | 0.5343 |
| (3) | |f2cem/f2| | 40.03 | 39.96 | 22.86 | 22.69 | 4.25 | 4.32 |

As is known from the foregoing data, each of the zoom lenses of Examples 1 to 6 has a zoom ratio of 106×, an entire system focal length of about 910 at the telephoto end, and a total angle of view of about 68° at the wide angle end, with each aberration being corrected satisfactorily, showing that a higher magnification, a longer focal length, a wider angle of view, and a higher performance have been realized simultaneously.

Next, an imaging apparatus according to an embodiment of the present invention will be described with reference to FIG. 15. As an example of imaging apparatus according to an embodiment of the present invention, a schematic configuration diagram of a television camera 10 that uses a zoom lens 1 according to an embodiment of the present invention is shown in FIG. 15. Note that a positive first lens group G1, a negative second lens group G2, a positive third lens group G3 composed of a positive third-a lens group G3a and a positive third-b lens group G3b, and a positive fourth lens group G4, including an aperture stop St, included in the zoom lens 1 are depicted schematically in FIG. 15.

The television camera 10 includes the zoom lens 1, a filter 2 having a low-pass filter function, an infrared cut filter function, and the like disposed on the image side of the zoom lens 1, each prism 3R, 3G, 3B of a color separation prism disposed on the image side of the filter 2, and image sensors 4R, 4G, 4B provided on the end face of each prism 3R, 3G, 3B. The image sensors 4R, 4G, 4B convert an optical image formed by the zoom lens 1 to an electrical signal and, for example, a CCD (Charge Coupled Device), a CMOS (Complementary Metal Oxide Semiconductor), and the like may be used. Each of the image sensors 4R, 4G, 4B is disposed such that the imaging surface thereof corresponds to the image plane of the zoom lens 1.

The television camera 10 further includes a signal processing unit 5 that arithmetically processes output signals from the image sensors 4R, 4G, 4B, a display unit 6 that displays an image formed by the signal processing unit 5, and a zoom control unit 7 that controls zooming of the zoom lens 1. Note that the television camera 10 is a so-called three-CCD imaging apparatus, but the imaging apparatus of the present invention is not limited to this and it may be an imaging apparatus that captures all the wavelength ranges by one image sensor.

So far, the present invention has been described by way of embodiments and examples, but the present invention is not limited to the foregoing embodiments and examples, and various modifications may be made. For example, values of radius of curvature, surface distance, refractive index, Abbe number, partial dispersion ratio, and aspherical surface coefficient of each lens are not limited to those shown in each example described above and may take other values.

Further, in the embodiment of the imaging apparatus, the description has been made by taking a television camera as an example and showing a diagram thereof, but the imaging apparatus of the present invention is not limited to this and the present invention may be applied to other imaging apparatuses, such as video cameras and the like.

What is claimed is:

1. A zoom lens, consisting of four lens groups, composed of a first lens group having a positive refractive power and being fixed during zooming, a second lens group having a negative refractive power and being moved during zooming, a third lens group having a positive refractive power and being moved during zooming to correct an image plane variation due to the zooming, and a fourth lens group having a positive refractive power and being fixed during zooming, in order from the object side, wherein:
   a stop is disposed on the most object side in the fourth lens group;
   the second lens group and the third lens group each pass through a point where the imaging magnification of each corresponding lens group is −1× at the same time during zooming from the wide angle end to the telephoto end; and
   the second lens group includes at least two positive lenses and at least one negative lens, and when the d-line Abbe number and the partial dispersion ratio between the g-line and the F-line of one positive lens included in the second lens group are taken as νp and Pp respectively, the zoom lens satisfies conditional expressions (1) and (2) given below:

$$75.00 < \nu p \quad (1)$$

$$0.520 < Pp < 0.550 \quad (2)$$

where, νp and Pp are defined, when the refractive indices of the positive lens related to the conditional expressions (1) and (2) with respect to the g-line, the F-line, the d-line, and the C-line of the Fraunhofer lines are taken as Ng, NF, Nd, and NC respectively, as νp=(Nd−1)/(NF−NC) and Pp=(Ng−NF)/(NF−NC).

2. The zoom lens of claim 1 wherein the second lens group includes, on the most image side, a cemented lens in which three lenses of a positive lens, a negative lens, and a positive lens are cemented in order from the object side.

3. The zoom lens of claim 2 wherein the one positive lens in the second lens group that satisfies the conditional expressions (1) and (2) constitutes the cemented lens.

4. The zoom lens of claim 1, wherein the second lens group includes a cemented lens on the most image side and satisfies a conditional expression (3) given below when the focal length of the cemented lens and the focal length of the second lens group are taken as f2cem and f2 respectively:

$$1.00 < |f2cem/f2| < 44.00 \quad (3).$$

5. The zoom lens of claim 1, wherein both the first and second lenses from the object side in the second lens group are single lenses having a negative refractive power, and the object side surface of the most object side negative lens in the second lens group is aspherical.

6. The zoom lens of claim 1, wherein:
   the third lens group is composed of a third-a lens group having a positive refractive power and a third-b lens group having a positive refractive power, in order from the object side; and the third-a lens group and the third-b lens group are moved independently during zooming from the wide angle end to the telephoto end.

7. The zoom lens of claim 1, wherein the zoom lens satisfies a conditional expression (1') given below:

$$80.00 < \nu p \qquad (1').$$

8. The zoom lens of claim 1, wherein the zoom lens satisfies a conditional expression (2') given below:

$$0.530 < Pp < 0.540 \qquad (2').$$

9. The zoom lens of claim 4, wherein the zoom lens satisfies a conditional expression (3') given below:

$$3.00 < |f2cem/f2| < 42.00 \qquad (3').$$

10. An imaging apparatus equipped with the zoom lens of claim 1.

* * * * *